United States Patent
Yamaga et al.

(10) Patent No.: US 11,302,351 B2
(45) Date of Patent: *Apr. 12, 2022

(54) HIGH DENSITY MAGNETIC RECORDING MEDIUM AND CARTRIDGE INCLUDING HIGH DENSITY MAGNETIC RECORDING MEDIUM

(71) Applicant: Sony Corporation, Tokyo (JP)

(72) Inventors: Minoru Yamaga, Miyagi (JP); Takanobu Iwama, Miyagi (JP); Jun Takahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 16/969,662

(22) PCT Filed: Nov. 19, 2018

(86) PCT No.: PCT/JP2018/042721
§ 371 (c)(1),
(2) Date: Aug. 13, 2020

(87) PCT Pub. No.: WO2019/159464
PCT Pub. Date: Aug. 22, 2019

(65) Prior Publication Data
US 2020/0402531 A1  Dec. 24, 2020

(30) Foreign Application Priority Data
Feb. 16, 2018  (JP) .............................. JP2018-026508

(51) Int. Cl.
*G11B 5/584* (2006.01)
*G11B 5/592* (2006.01)
(Continued)

(52) U.S. Cl.
CPC ........ *G11B 5/5928* (2013.01); *G11B 5/00813* (2013.01); *G11B 5/00817* (2013.01);
(Continued)

(58) Field of Classification Search
None
See application file for complete search history.

(56) References Cited

U.S. PATENT DOCUMENTS 8,767,342 B2 * 7/2014 Olson ................ G11B 5/00821
                                                    360/77.12
8,797,674 B2 * 8/2014 Olson .................... G11B 5/584
                                                    360/77.12
(Continued)

FOREIGN PATENT DOCUMENTS

JP  2002-083412 A   3/2002
JP  2005-038579 A   2/2005
JP  2014-199706 A  10/2014

OTHER PUBLICATIONS

International Search Report issued in connection with PCT/JP2018/042721, dated Dec. 11, 2018.

*Primary Examiner* — Tan X Dinh
(74) *Attorney, Agent, or Firm* — K&L Gates LLP

(57) ABSTRACT

A magnetic recording medium according to the present technology includes: a base material; and a magnetic layer, in which the magnetic recording medium has a tape shape that is long in a longitudinal direction and short in a width direction, the magnetic layer includes a data band and a servo band, a data signal being written to the data band, the data band being long in the longitudinal direction, a servo signal being written to the servo data, the servo band being long in the longitudinal direction, the degree of perpendicular orientation of the magnetic layer being 65% or more, a full width at half maximum of an isolated waveform in a reproduced waveform of the servo signal is 195 nm or less,
(Continued)

the magnetic layer has a thickness of 90 nm or less, and the base material has a thickness of 4.2 μm or less.

20 Claims, 9 Drawing Sheets

(51) Int. Cl.
    *G11B 5/706*         (2006.01)
    *G11B 5/008*         (2006.01)
    *G11B 5/733*         (2006.01)
    *G11B 20/12*         (2006.01)

(52) U.S. Cl.
    CPC .......... *G11B 5/584* (2013.01); *G11B 5/70621* (2013.01); *G11B 5/70678* (2013.01); *G11B 5/733* (2013.01); *G11B 20/1202* (2013.01)

(56) References Cited

U.S. PATENT DOCUMENTS

| | | | |
|---|---|---|---|
| 8,804,276 B2 * | 8/2014 | Olson ...................... | G11B 5/78 |
| | | | 360/77.12 |
| 8,817,415 B2 * | 8/2014 | Olson ................ | G11B 5/00813 |
| | | | 360/77.12 |
| 10,796,724 B1 * | 10/2020 | Nakashio ........... | G11B 27/3027 |
| 11,031,033 B2 * | 6/2021 | Terakawa ........... | G11B 5/70621 |
| 2002/0027732 A1 | 3/2002 | Arita et al. | |
| 2004/0265644 A1 | 12/2004 | Tsujimoto et al. | |
| 2008/0117359 A1 | 5/2008 | Yoon et al. | |
| 2014/0268414 A1 | 9/2014 | Nakashio et al. | |
| 2020/0411042 A1 * | 12/2020 | Yamaga ................ | G11B 5/5928 |
| 2020/0411044 A1 * | 12/2020 | Hashimoto ............ | G11B 5/735 |

\* cited by examiner

| | Perpendicular orientation % | Longitudinal orientation % | Distance D Recording track width Wd % | Distance D μm | Recording track width Wd μm | Magnetic powder shape Contained elements other than Fe | Full width at half maximum of isolated waveform nm | Shape | Aspect ratio | Particle volume nm3 | Magnetic layer thickness nm | Remark |
|---|---|---|---|---|---|---|---|---|---|---|---|---|
| Example1 | 65 | 35 | 21.3 | 0.12 | 0.56 | Hexagonal plate Ba | 180 | Plate | 2.8 | 1950 | 80 | Reference |
| Example2 | 66 | 31 | 21.3 | 0.12 | 0.56 | Hexagonal plate Ba | 160 | Plate | 2.8 | 1950 | 80 | Increased perpendicular orientation |
| Example3 | 70 | 29 | 21.3 | 0.12 | 0.56 | Hexagonal plate Ba | 150 | Plate | 2.8 | 1950 | 80 | Further increased perpendicular orientation |
| Example4 | 71 | 25 | 21.3 | 0.12 | 0.56 | Hexagonal plate Ba | 140 | Plate | 2.8 | 1950 | 80 | Further increased perpendicular orientation |
| Example5 | 66 | 31 | 44.5 | 0.25 | 0.56 | Hexagonal plate Ba | 180 | Plate | 2.8 | 1950 | 80 | Azimuth angle of 24 degrees |
| Example6 | 66 | 31 | 44.5 | 0.54 | 1.21 | Hexagonal plate Ba | 180 | Plate | 2.8 | 1950 | 80 | Azimuth angle of 24 degrees, difference in recording track width |
| Example7 | 66 | 31 | 44.5 | 0.17 | 0.38 | Hexagonal plate Ba | 180 | Plate | 2.8 | 1950 | 80 | Azimuth angle of 24 degrees, difference in recording track width |
| Example8 | 66 | 31 | 32.5 | 0.54 | 1.66 | Hexagonal plate Ba | 170 | Plate | 2.8 | 1950 | 80 | Azimuth angle of 18 degrees |
| Example9 | 66 | 31 | 32.5 | 0.25 | 0.77 | Hexagonal plate Ba | 170 | Plate | 2.8 | 1950 | 80 | Azimuth angle of 18 degrees, difference in recording track width |
| Example10 | 66 | 31 | 32.5 | 0.17 | 0.52 | Hexagonal plate Ba | 170 | Plate | 2.8 | 1950 | 80 | Azimuth angle of 18 degrees, difference in recording track width |
| Example11 | 66 | 31 | 21.3 | 0.62 | 2.91 | Hexagonal plate Ba | 160 | Plate | 2.8 | 1950 | 80 | Difference in recording track width |
| Example12 | 66 | 31 | 21.3 | 0.33 | 1.55 | Hexagonal plate Ba | 160 | Plate | 2.8 | 1950 | 80 | Difference in recording track width |
| Example13 | 66 | 31 | 21.3 | 0.12 | 0.56 | Hexagonal plate Ba | 160 | Plate | 2.8 | 1950 | 80 | Difference in recording track width |
| Example14 | 66 | 31 | 21.3 | 0.08 | 0.38 | Hexagonal plate Ba | 160 | Plate | 2.8 | 1950 | 80 | Difference in recording track width |
| Example15 | 66 | 31 | 21.3 | 0.12 | 0.56 | Hexagonal plate Sr | 160 | Plate | 3 | 2000 | 80 | Difference in magnetic particles |
| Example16 | 66 | 31 | 21.3 | 0.12 | 0.56 | Spherical shape None | 160 | Spherical | 1.1 | 2150 | 80 | Difference in magnetic particles |
| Example17 | 66 | 31 | 21.3 | 0.12 | 0.56 | Spherical Ga | 160 | Spherical | 1 | 2150 | 80 | Difference in magnetic particles |
| Example18 | 66 | 31 | 21.3 | 0.12 | 0.56 | Cubic Co | 160 | Cubic | 1.7 | 2200 | 80 | Difference in magnetic particles |
| Comparative Example1 | 55 | 46 | 21.3 | 0.12 | 0.56 | Hexagonal plate Ba | 220 | Plate | 2.8 | 1950 | 80 | |
| Comparative Example2 | 61 | 40 | 21.3 | 0.12 | 0.56 | Hexagonal plate Ba | 200 | Plate | 2.8 | 1950 | 80 | |
| Comparative Example3 | 66 | 31 | 21.3 | 0.06 | 0.28 | Hexagonal plate Ba | 160 | Plate | 2.8 | 1950 | 80 | System collapsed |

FIG. 11

| | Perpendicular orientation % | Longitudinal orientation % | Distance D Recording track width Wd % | Distance D μm | Recording track width Wd μm | Magnetic powder shape Contained elements other than Fe | Full width at half maximum of isolated waveform nm | Shape | Aspect ratio | Particle volume nm3 | Magnetic layer thickness nm | Remark |
|---|---|---|---|---|---|---|---|---|---|---|---|---|
| Example 19 | 75 | 23 | 21.3 | 0.12 | 0.56 | Hexagonal plate Ba | 138 | Plate | 2.8 | 1950 | 80 | Further increased perpendicular orientation |
| Example 20 | 80 | 21 | 21.3 | 0.12 | 0.56 | Hexagonal plate Ba | 130 | Plate | 2.8 | 1950 | 80 | Further increased perpendicular orientation |
| Example 21 | 85 | 18 | 21.3 | 0.12 | 0.56 | Hexagonal plate Ba | 119 | Plate | 2.8 | 1950 | 80 | Further increased perpendicular orientation |
| Example 22 | 65 | 35 | 21.3 | 0.12 | 0.56 | Hexagonal plate Ba | 130 | Plate | 2.5 | 1600 | 80 | Reduced particle volume |
| Example 23 | 65 | 35 | 21.3 | 0.12 | 0.56 | Hexagonal plate Ba | 125 | Plate | 2.3 | 1300 | 80 | Further reduced particle volume |
| Example 24 | 75 | 23 | 21.3 | 0.12 | 0.56 | Hexagonal plate Ba | 120 | Plate | 2.8 | 1950 | 60 | Increased perpendicular orientation and make magnetic layer thinner |
| Example 25 | 80 | 21 | 21.3 | 0.12 | 0.56 | Hexagonal plate Ba | 100 | Plate | 2.8 | 1950 | 40 | Increase perpendicular orientation and make magnetic layer thinner |
| Comparative Example 4 | 65 | 35 | | | 0.56 | Hexagonal plate Ba | 210 | Plate | 2.8 | 2500 | 80 | Increased particle volume |
| Comparative Example 5 | 65 | 35 | 21.3 | 0.12 | 0.56 | Hexagonal plate Ba | 220 | Plate | 2.8 | 2800 | 80 | Further increased particle volume |

FIG. 12

HIGH DENSITY MAGNETIC RECORDING MEDIUM AND CARTRIDGE INCLUDING HIGH DENSITY MAGNETIC RECORDING MEDIUM

TECHNICAL FIELD

The present technology relates to a technology of a magnetic recording medium and the like.

BACKGROUND ART

In recent years, a magnetic recording medium has been widely used for backing up electronic data, and the like. As one magnetic recording medium, a magnetic tape including a magnetic layer has been widely used.

In the magnetic layer of the magnetic recording medium, a data band including a plurality of recording tracks is provided, and data is recorded on these recording tracks. In addition, in the magnetic layer, servo bands are provided at positions where data band is sandwiched in the lateral direction, and a servo signal is recorded on this servo band. A magnetic head reads the servo signal recorded on the servo band, and is aligned with respect to the recording track by using the read servo signal.

As a recording method to a magnetic recording medium, a horizontal magnetic recording method in which magnetic particles in the magnetic layer are magnetized in a horizontal direction to record data and a vertical magnetic recording method in which magnetic particles in the magnetic layer are magnetized in a vertical direction to record data are known. The vertical magnetic recording method can record data with high density as compared with the horizontal magnetic recording method.

CITATION LIST

Patent Literature

[Patent Literature 1] Japanese Patent Application Laid-open No. 2014-199706

DISCLOSURE OF INVENTION

Technical Problem

In recent years, further high-density recording has been demanded because of an increase in the amount of data to be recorded, and there is a need for a technology capable of further improving the recording density of data.

In view of the circumstances as described above, it is an object of the present technology to provide a technology capable of further improving the recording density of data.

Solution to Problem

A magnetic recording medium according to the present technology is a magnetic recording medium, including: a magnetic layer, in which the magnetic recording medium has a tape shape that is long in a longitudinal direction and short in a width direction, the magnetic layer includes a data band and a servo band, a data signal being written to the data band, the data band being long in the longitudinal direction, a servo signal being written to the servo data, the servo band being long in the longitudinal direction, the degree of perpendicular orientation of the magnetic layer being 65% or more, a full width at half maximum of an isolated waveform in a reproduced waveform of the servo signal is 195 nm or less, the magnetic layer has a thickness of 90 nm or less, and the base material has a thickness of 4.2 µm or less.

As a result, the recording density of data can be further improved.

In the above-mentioned magnetic recording medium, the full width at half maximum of the isolated waveform may be 180 nm or less.

In the above-mentioned magnetic recording medium, the full width at half maximum of the isolated waveform may be 160 nm or less.

In the above-mentioned magnetic recording medium, the full width at half maximum of the isolated waveform may be 140 nm or less.

In the above-mentioned magnetic recording medium, the full width at half maximum of the isolated waveform may be 120 nm or less.

In the above-mentioned magnetic recording medium, the degree of perpendicular orientation may be 70% or more.

In the above-mentioned magnetic recording medium, the degree of perpendicular orientation may be 75% or more.

In the above-mentioned magnetic recording medium, the degree of perpendicular orientation may be 80% or more.

In the above-mentioned magnetic recording medium, the data band may include a plurality of recording tracks that is long in the longitudinal direction, is aligned in the width direction, and has a predetermined recording track width for each track in the width direction, the servo signal may include a plurality of stripes that is inclined with a predetermined azimuth angle with respect to the width direction, and a distance in the longitudinal direction between a point P1 and a point P2 may be 0.08 µm or more, the point P1 being an arbitrary point on an arbitrary stripe among the plurality of stripes, the point P2 being a point on the arbitrary stripe at a distance by an amount corresponding to the recording track width in the width direction with respect to the point P1.

In the above-mentioned magnetic recording medium, the distance between the point P1 and the pint P2 in the longitudinal direction may be 0.62 µm or less.

In the above-mentioned magnetic recording medium, the degree of longitudinal orientation of the magnetic layer may be 35% or less.

The above-mentioned magnetic recording medium may have a coercive force of 2,000 Oe or less in the longitudinal direction.

In the above-mentioned magnetic recording medium, a ratio of the area of the servo band to the area of an entire surface of the magnetic layer may be 4.0% or less.

In the above-mentioned magnetic recording medium, the magnetic layer may contain a magnetic powder, and the magnetic powder may have a particle volume of 2,300 $nm^3$ or less.

In the above-mentioned magnetic recording medium, the number of data bands may be 4n (n represents an integer greater than or equal to two), and the number of servo bands may be 4n+1.

In the above-mentioned magnetic recording medium, a width of the servo band may be 95 µm or less.

In the above-mentioned magnetic recording medium, the data band may have a plurality of recording tracks that is long in the longitudinal direction, is aligned in the width direction, and has a predetermined recording track width for each track in the width direction, and the recording track width may be 2.0 µm or less.

In the above-mentioned magnetic recording medium, one-bit length in the longitudinal direction in a data signal to be recorded on the data band may be 48 nm or less.

In the above-mentioned magnetic recording medium, the magnetic layer may include a magnetic powder of hexagonal ferrite, ε-iron oxide, or cobalt-containing ferrite.

A cartridge according to the present technology is a cartridge, including: a magnetic recording medium including a base material, and a magnetic layer, in which the magnetic recording medium has a tape shape that is long in a longitudinal direction and short in a width direction, the magnetic layer includes a data band and a servo band, a data signal being written to the data band, the data band being long in the longitudinal direction, a servo signal being written to the servo data, the servo band being long in the longitudinal direction, the degree of perpendicular orientation of the magnetic layer being 65% or more, a full width at half maximum of an isolated waveform in a reproduced waveform of the servo signal is 195 nm or less, the magnetic layer has a thickness of 90 nm or less, and the base material has a thickness of 4.2 μm or less.

Advantageous Effects of Invention

As described above, in accordance with the present technology, it is possible to provide a technology capable of further improving the recording density of data.

BRIEF DESCRIPTION OF THE DRAWINGS

FIG. 11 is a diagram showing various Examples and various Comparative Examples.

FIG. 12 is a diagram showing still other various Examples and various Comparative Examples.

MODE(S) FOR CARRYING OUT THE INVENTION

Embodiments according to the present technology will now be described below with reference to the drawings.

Configuration of Magnetic Recording Medium

Figure 1:
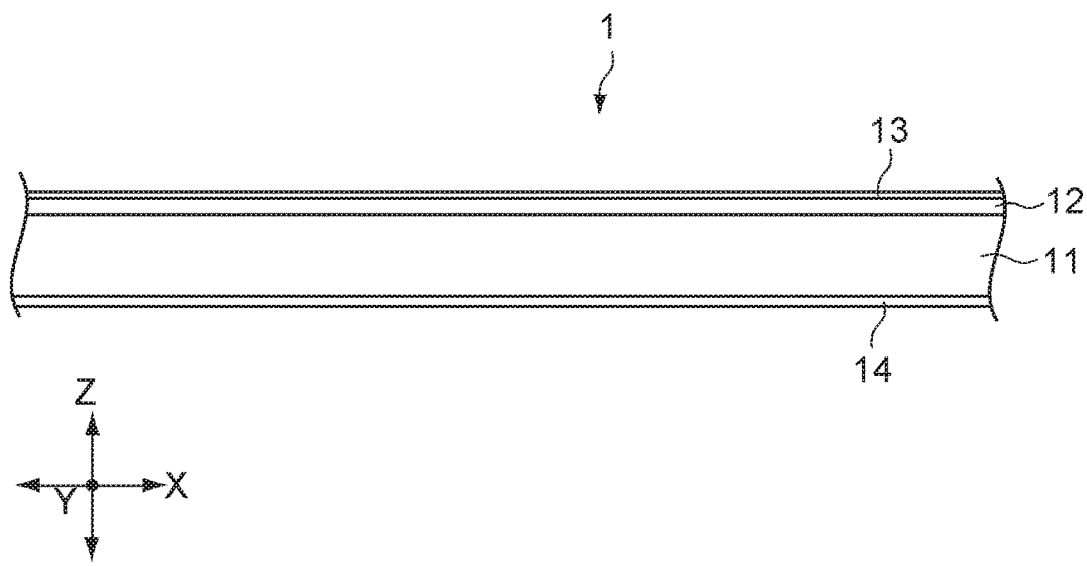
FIG. 1 is a schematic diagram of a magnetic recording medium as viewed from the side.

First, the basic configuration of a magnetic recording medium 1 will be described. FIG. 1 is a schematic diagram of the magnetic recording medium 1 as viewed from the side.

Figure 2:
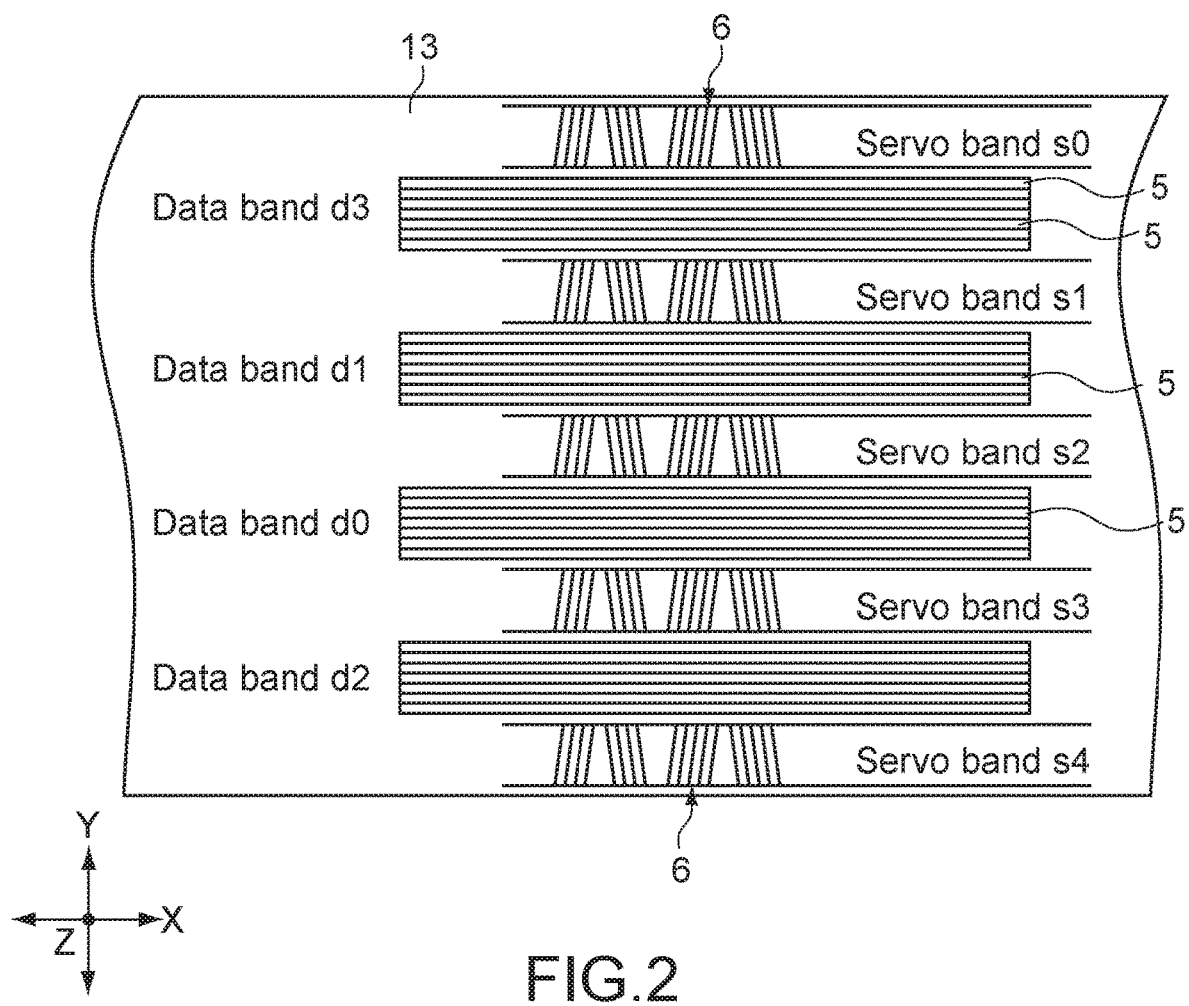
FIG. 2 is a schematic diagram of the magnetic recording medium as viewed from above.

As shown in FIG. 1 and FIG. 2, the magnetic recording medium 1 has a tape shape that is long in the longitudinal direction (X axis direction), short in the width direction (Y axis direction), and thin in the thickness direction (Z axis direction). Note that in the present specification (and the drawings), a coordinate system with reference to the magnetic recording medium 1 is represented by an XYZ coordinate system.

The magnetic recording medium 1 is favorably configured to be capable of recording signals at the shortest recording wavelengths of 96 nm or less, more favorably 75 nm or less, still more favorably 60 nm or less, and particularly favorably 50 nm or less. The magnetic recording medium 1 is favorably used in a data recording device including a ring-type head as a recording head.

Referring to FIG. 1, the magnetic recording medium 1 includes a tape-shaped base material 11 that is long in the longitudinal direction (X axis direction), a non-magnetic layer 12 provided on one main surface of the base material 11, a magnetic layer 13 provided on the non-magnetic layer 12, and a back layer 14 provided on the other main surface of the base material 11. Note that the back layer 14 may be provided as necessary and the back layer 14 may be omitted.

[Base Material]

The base material 11 is a non-magnetic support that supports the non-magnetic layer 12 and the magnetic layer 13. The base material 11 has a long film-like shape. The upper limit value of the average thickness of the base material 11 is favorably 4.2 μm or less, more favorably 3.8 μm or less, and still more favorably 3.4 μm or less. In the case where the upper limit value of the average thickness of the base material 11 is 4.2 μm or less, the recording capacity that can be recorded in one cartridge 21 (see FIG. 5) can be higher than that of a typical magnetic recording medium.

The average thickness of the base material 11 is determined as follows. First, the magnetic recording medium 1 having a ½ inch width is prepared and cut into a length of 250 mm to prepare a sample. Subsequently, the layers (i.e. the non-magnetic layer 12, the magnetic layer 13, and the back layer 14) other than the base material 11 of the sample are removed with a solvent such as MEK (methylethylketone) and dilute hydrochloric acid. Next, using a laser hologage manufactured by Mitsutoyo as a measuring device, the thickness of the sample (base material 11)—is measured at positions of five or more points, and the measured values are simply averaged (arithmetically averaged) to calculate the average thickness of the base material 11. Note that the measurement positions are randomly selected from the sample.

The base material 11 contains, for example, at least one selected from the group consisting of polyesters, polyolefins, cellulose derivatives, vinyl resins, and different polymer resins. In the case where the base material 11 contains two or more of the above-mentioned materials, the two or more materials may be mixed, copolymerized, or stacked.

The polyesters include, for example, at least one of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), or polyethylene bisphenoxycarboxylate.

The polyolefins include, for example, at least one of PE (polyethylene) or PP (polypropylene). The cellulose derivatives include, for example, at least one of cellulose diacetate, cellulose triacetate, CAB (cellulose acetate butyrate), or CAP (cellulose acetate propionate). The vinyl resins include, for example, at least one of PVC (polyvinyl chloride) or PVDC (polyvinylidene chloride).

The different polymer resins include, for example, at least one of PA (polyamide, nylon), aromatic PA (aromatic polyamide, aramid), PI (polyimide), aromatic PI (aromatic polyimide), PAI (polyamideimide), aromatic PAI (aromatic polyamideimide), PBO (polybenzoxazole, e.g., Zylon (registered trademark)), polyether, PEK (polyetherketone), polyetherester, PES (polyethersulfone), PEI (polyetherimide), PSF (polysulfone), PPS (polyphenylene sulfide), PC (polycarbonate), PAR (polyarylate), or PU (polyurethane).

[Magnetic Layer]

The magnetic layer 13 is a recording layer for recording data signals. The magnetic layer 13 contains a magnetic powder, a binder, conductive particles, and the like. The magnetic layer 13 may further contain additives such as a lubricant, an abrasive, and a rust inhibitor, as necessary. The magnetic layer 13 has a surface in which a large number of holes are provided. The lubricant is stored in the large number of holes. It is favorable that the large number of holes extend in the direction perpendicular to the surface of magnetic layer.

The degree of perpendicular orientation (No demagnetizing field correction: The same applies hereinafter) of the magnetic layer 13 is typically 65% or more. Further, the degree of degree of longitudinal orientation of the magnetic layer 13 is typically 35% or less.

The thickness of the magnetic layer 13 is typically 35 nm or more and 90 nm or less. By setting the thickness of the magnetic layer 13 to 35 nm or more and 90 nm or less as described above, it is possible to improve the electromagnetic conversion characteristics. Further, from the viewpoint of a full width at half maximum (described below) of an isolated waveform in the reproduced waveform of a servo signal 6, the thickness of the magnetic layer 13 is favorably 90 nm or less, more favorably 80 nm or less, more favorably 60 nm or less, and still more favorably 40 nm or less. By setting the thickness of the magnetic layer 13 to 90 nm or less, it is possible to narrow (195 nm or less) the full width at half maximum of the isolated waveform in the reproduced waveform of the servo signal 6, and sharpen the peak of the reproduced waveform of the servo signal. As a result, since the reading accuracy of the servo signal 6 is improved, the recording density of data can be improved by increasing the number of recording tracks (as will be described in detail later).

The thickness of the magnetic layer 13 can be obtained, for example, in the following manner. First, the magnetic recording medium 1 is thinly processed perpendicular to the main surface thereof to prepare a sample piece, and the cross section of the test piece is observed by a transmission electron microscope (TEM) under the following conditions.

Device: TEM (H9000NAR manufactured by Hitachi, Ltd.)

Acceleration voltage: 300 kV

Magnification: 100,000 times

Next, the thickness of the magnetic layer 13 is measured at positions of at least 10 or more points in the longitudinal direction of the magnetic recording medium 110 by using the obtained TEM image, and then, the measured values are simply averaged (arithmetically averaged) to give the thickness of the magnetic layer 13. Note that the measurement positions are randomly selected from the sample piece.

(Magnetic Powder)

The magnetic powder contains a powder of nanoparticles containing ε-iron oxide (hereinafter, referred to as "ε-iron oxide particles"). The ε-iron oxide particles are capable of achieving a high coercive force even if the ε-iron oxide particles are fine particles. It is favorable that the ε-iron oxide contained in the ε-iron oxide particles is preferentially crystallographically oriented in the thickness direction (perpendicular direction) of the magnetic recording medium 1.

The ε-iron oxide particles have a spherical shape or substantially spherical shape, or a cubic shape or substantially cubic shape. Since the ε-iron oxide particles have the above-mentioned shapes, the area of contact between the particles in the thickness direction of the magnetic recording medium 1 can be reduced, and the aggregation of the particles can be suppressed when ε-iron oxide particles are used as the magnetic particles, as compared with the case where hexagonal plate-shaped barium ferrite particles are used as the magnetic particles. Therefore, it is possible to increase the dispersibility of the magnetic powder and achieve a more favorable SNR (Signal-to-Noise Ratio).

The ε-iron oxide particles have a core-shell structure. Specifically, the ε-iron oxide particles include a core portion, and a shell portion that has a two-layer structure and is provided around the core portion. The shell portion having a two-layer structure includes a first shell portion provided on the core portion, and a second shell portion provided on the first shell portion.

The core portion contains ε-iron oxides. The ε-iron oxide contained in the core portion favorably has $\varepsilon\text{-}Fe_2O_3$ crystal as the main phase, and has more favorably a single phase of $\varepsilon\text{-}Fe_2O_3$.

The first shell portion covers at least a part of the periphery of the core portion. Specifically, the first shell portion may partially cover the periphery of the core portion, or may cover the entire periphery of the core portion. From the viewpoint of make exchange coupling of the core portion and the first shell portion sufficient and improving the magnetic properties, the first shell portion favorably covers the entire surface of the core portion 21.

The first shell portion is a so-called soft magnetic layer, and contains, for example, a soft magnetic material such as α-Fe, a Ni—Fe alloy, or a Fe—Si—Al alloy. α-Fe may be obtained by reducing the ε-iron oxide contained in the core portion 21.

The second shell portion is an oxide coating film as an oxidation prevention layer. The second shell portion contains α-iron oxide, aluminum oxide, or silicon oxide. The α-iron oxide includes, for example, at least one iron oxide selected from the group consisting of $Fe_3O_4$, $Fe_2O_3$ and FeO. In the case where the first shell portion contains α-Fe (soft magnetic material), the α-iron oxide may be one obtained by oxidizing α-Fe contained in the first shell portion 22a.

Since the ε-iron oxide particles includes first shell portion as described above the coercive force Hc of the ε-iron oxide particles (core shell particles) as a whole can be adjusted to a coercive force Hc suitable for recording while keeping the coercive force Hc of the core portion alone at a large value in order to ensure high thermal stability. Further, since the ε-iron oxide particles includes the second shell portion as described above, the ε-iron oxide particles are exposed to air and rust or the like is generated on the surfaces of the particles during and before the process of producing the magnetic recording medium, thereby making it possible to suppress the deterioration of the characteristics of the ε-iron oxide particles. Therefore, it is possible to suppress the deterioration of the characteristics of the magnetic recording medium 1.

The average particle size (average maximum particle size) of the magnetic powder is favorably 22 nm or less, more favorably 8 nm or more and 22 nm or less, and still more favorably 12 nm or more and 22 nm or less.

The average aspect ratio of the magnetic powder is favorably 1 or more and 2.5 or less, more favorably 1 or more and 2.1 or less, and still more favorably 1 or more and 1.8 or less. In the case where the average aspect ratio of the magnetic powder is within the range of 1 or more and 2.5 or less, aggregation of the magnetic powder can be suppressed. Further, when perpendicularly orienting the magnetic powder in the process of forming the magnetic layer 13, it is possible to suppress the resistance applied to the magnetic powder. Therefore, the perpendicular orientation of the magnetic powder can be improved.

The average volume (particle volume) Vave of the magnetic powder is favorably 2,300 nm$^3$ or less, more favorably 2,200 nm$^3$ or less, more favorably 2,100 nm$^3$ or less, more favorably 1,950 nm$^3$ or less, more favorably 1,600 nm$^3$ or less, and still more favorably 1,300 nm$^3$ or less. In the case where the average volume Vave of the magnetic powder is 2,300 nm$^3$ or less, the full width at half maximum of the isolated waveform in the reproduced waveform of the servo signal 6 can be narrowed (to 195 nm or less), and the peak of the reproduced waveform of the servo signal can be sharpened. This improves the accuracy of reading the servo signal, so that the recording density of data can be improved by increasing then number of recording tracks (as will be described in detail later). Note that the smaller the average volume Vave of the magnetic powder, the better. Thus, the lower limit value of the volume is not particularly limited. However, for example, the lower limit value is 1000 nm$^3$ or more.

The average particle size, the average aspect ratio, and the average volume Vave of the above-mentioned magnetic powder are obtained as follows (e.g., in the case where the magnetic powder has a shape such as a spherical shape as in the ε-iron oxide particles). First, the magnetic recording medium 1 to be measured is processed by the FIB (Focused Ion Beam) method or the like to prepare a slice, and the cross-section of the slice is observed by TEM. Next, 50 magnetic powders are randomly selected from the obtained TEM photograph, and a major axis length DL and a minor axis length DS of each of the magnetic powder are measured. Here, the major axis length DL means the largest one (so-called maximum Feret diameter) of the distances between two parallel lines drawn from all angles so as to be in contact with the contour of the magnetic powder. Meanwhile, the minor axis length DS means the largest one of the lengths of the magnetic powder in a direction perpendicular to the major axis of the magnetic powder.

Subsequently, the measured major axis lengths DL of the 50 magnetic powders are simply averaged (arithmetically averaged) to obtain an average major axis length DLave. Then, the average major axis length DLave obtained in this manner is used as the average particle size of the magnetic powder. Further, the measured minor axis lengths DS of the 50 magnetic powders are simply averaged (arithmetically averaged) to obtain an average minor axis length DSave. Next, an average aspect ratio (DLave/DSave) of the magnetic powder is obtained on the basis of the average major axis length DLave and the average minor axis length DSave.

Next, an average volume (particle volume) Vave of the magnetic powder is obtained from the following formula by using the average major axis length DLave.

$$Vave = \pi/6 \times DLave^3$$

In this description, the case where the ε-iron oxide particles include a shell portion having a two-layer structure has been described. However, the ε-iron oxide particles may include a shell portion having a single-layer structure. In this case, the shell portion has a configuration similar to that of the first shell portion. However, from the viewpoint of suppressing the characteristic deterioration of the ε-iron oxide particles, it is favorable that the ε-iron oxide particles include a shell portion having a two-layer structure as described above.

In the above description, the case where the ε-iron oxide particles have a core-shell structure has been described. However, the ε-iron oxide particles may contain an additive instead of the core-shell structure, or may contain an additive while having a core-shell structure. In this case, some Fe of the ε-iron oxide particles are substituted by the additives. Also by causing the ε-iron oxide particles to contain an additive, the coercive force Hc of the ε-iron oxide particles as a whole can be adjusted to a coercive force Hc suitable for recording, and thus, the ease of recording can be improved. The additive is a metal element other than iron, favorably, a trivalent metal element, more favorably at least one of Al, Ga, or In, and still more favorably at least one of Al or Ga.

Specifically, the ε-iron oxide containing the additive is ε-Fe$_{2-x}$M$_x$O$_3$ crystal (However, M represents a metal element other than iron, favorably a trivalent metal element, more favorably at least one of Al, Ga or In, and still more favorably at least one of Al or Ga. x satisfies the following formula represented by: 0<x<1, for example.).

The magnetic powder may contain a powder of nanoparticles (hereinafter, referred to as "hexagonal ferrite particles".) containing hexagonal ferrite. The hexagonal ferrite particles have, for example, a hexagonal plate shape or a substantially hexagonal plate shape. The hexagonal ferrite favorably contains at least one of Ba, Sr, Pb, or Ca, more favorably at least one of Ba or Sr. The hexagonal ferrite may specifically be, for example, barium ferrite or strontium ferrite. Barium ferrite may further contain at least one of Sr, Pb, or Ca, in addition to Ba. Strontium ferrite may further contain at least one of Ba, Pb, or Ca, in addition to Sr.

More specifically, the hexagonal ferrite has an average composition represented by the following general formula represented by: MFe$_{12}$O$_{19}$. However, M represents, for example, at least one metal selected from the group consisting of Ba, Sr, Pb, and Ca, favorably at least one metal selected from the group consisting of Ba and Sr. M may represent a combination of Ba and one or more metals selected from the group consisting of Sr, Pb, and Ca. Further, M may represent a combination of Sr and one or more metals selected from the group consisting of Ba, Pb, and Ca. In the above-mentioned general formula, some Fe may be substituted by other meatal elements.

In the case where the magnetic powder contains a powder of hexagonal ferrite particles, the average particle size of the magnetic powder is favorably 50 nm or less, more favorably 10 nm or more and 40 nm or less, and still more favorably 15 nm or more and 30 nm or less. In the case where the magnetic powder contains a powder of hexagonal ferrite particles, the average aspect ratio of the magnetic powder and the average volume Vave of the magnetic powder are as described above.

Note that the average particle size, the average aspect ratio, and the average volume Vave of the magnetic powder are obtained as follows (e.g., in the case where the magnetic powder has a plate-like shape as in hexagonal ferrite). First, the magnetic recording medium 1 to be measured is processed by the FIB method or the like to produce a slice, and the cross-section of the slice is observed by TEM. Next, 50 magnetic powders oriented at an angle of 75 degrees or more with respect to the horizontal direction are randomly selected from the obtained TEM photograph, and a maximum plate thickness DA of each magnetic powder is measured. Subsequently, the measured maximum plate thicknesses DA of the 50 magnetic powders are simply averaged (arithmetically averaged) to obtain an average maximum plate thickness DAave.

Next, the surface of the magnetic layer 13 of the magnetic recording medium 1 is observed by TEM. Next, 50 magnetic powders are randomly selected from the obtained TEM photograph, and a maximum plate diameter DB of each magnetic powder is measured. Here, the maximum plate diameter DB means the largest one (so-called maximum Feret diameter) of the distances between two parallel lines drawn from all angles so as to be in contact with the contour of the magnetic powder. Subsequently, the measured maximum plate diameters DB of the 50 magnetic powders are simply averaged (arithmetically averaged) to obtain an average maximum plate diameter DBave. Then, the average maximum plate diameter DBave obtained in this manner is used as the average particle size of the magnetic powder. Next, an average aspect ratio (DBave/DAave) of the magnetic powder is obtained on the basis of the average maximum plate thickness DAave and the average maximum plate diameter DBave.

Next, using the average maximum plate thickness DAave and the average maximum plate diameter DBave, an average volume (particle volume) Vave of the magnetic powder is obtained from the following formula.

$$Vave = 3\sqrt{3}/8 \times DAave \times DBave^2$$

The magnetic powder may contain a powder of nanoparticles (hereinafter, referred to as "cobalt ferrite particles".) containing Co-containing spinel ferrite. The cobalt ferrite particles favorably have uniaxial anisotropy. The cobalt ferrite particles have, for example, a cubic shape or a substantially cubic shape. The Co-containing spinel ferrite may further contain at least one of Ni, Mn, Al, Cu, or Zn, in addition to Co.

The Co-containing spinel ferrite has, for example, the average composition represented by the following formula (1).

$$Co_xM_yFe_2O_z \tag{1}$$

(However, in the formula (1), M represents, for example, at least one metal selected from the group consisting of Ni, Mn, Al, Cu, and Zn. x represents a value within the range of $0.4 \leq x \leq 1.0$. y represents a value within the range of $0 \leq y \leq 0.3$. However, x and y satisfy the relationship represented by the following formula: $(x+y) \leq 1.0$. z represents a value within the range of $3 \leq z \leq 4$. Some Fe may be substituted by other metal elements.)

In the case where the magnetic powder includes a powder of cobalt ferrite particles, the average particle size of the magnetic powder is favorably 25 nm or less, more favorably 23 nm or less. In the case where the magnetic powder includes a powder of cobalt ferrite particles, the average aspect ratio of the magnetic powder and the average volume Vave of the magnetic powder are similar to those described above. Further, also the average aspect ratio of the magnetic powder is obtained in a manner similar to that described above.

Note that in the case where the magnetic powder has a cubic shape as in cobalt ferrite particles, the average volume (particle volume) Vave of the magnetic powder can be obtained as follows. First, the surface of the magnetic layer 13 of the magnetic recording medium 1 is observed by TEM.

Next, 50 magnetic powders are randomly selected from the obtained TEM photograph, and a side length DC of each of the magnetic powders is measured. Subsequently, the measured side lengths DC of the 50 magnetic powders are simply averaged (arithmetically averaged) to obtain an average side length DCave. Next, using the average side length DCave, the average volume (particle volume) Vave of the magnetic powder is obtained from the following formula.

$$Vave = DCave^3$$

(Binder)

As the binder, a resin having a structure in which a crosslinking reaction is imparted to a polyurethane resin, a vinyl chloride resin, or the like is favorable. However, the binder is not limited thereto. Other resins may be appropriately blended depending on the physical properties and the like required for the magnetic recording medium 1. The resin to be blended is not particularly limited as long as it is a resin commonly used in the coating-type magnetic recording medium 1.

Examples of the resin include polyvinyl chloride, polyvinyl acetate, a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinyl chloride-vinylidene chloride copolymer, a vinyl chloride-acrylonitrile copolymer, an acrylic ester-acrylonitrile copolymer, an acrylic ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, cellulose derivatives (cellulose acetate butyrate, cellulose diacetate, cellulose triacetate, cellulose propionate, nitrocellulose), a styrene butadiene copolymer, a polyester resin, an amino resin, and synthetic rubber.

Further, examples of the thermosetting resin or the reactive resin include a phenol resin, an epoxy resin, a urea resin, a melamine resin, an alkyd resin, a silicone resin, a polyamine resin, and a urea formaldehyde resin.

In order to improve the dispersibility of the magnetic powder, polar functional groups such as $-SO_3M$, $-OSO_3M$, $-COOM$, and $P=O(OM)_2$ may be introduced into the binders described above. Here, M in the formula represents a hydrogen atom, or an alkali metal such as lithium, potassium, and sodium.

Further, examples of the polar functional groups include those of the side chain type having the terminal group of $-NR1R2$ or $-NR1R2R3^+X^-$ and those of the main chain type having $>NR1R2^+X^-$. Here R1, R2, and R3 each represent a hydrogen atom or a hydrocarbon group, and $X^-$ represents a halogen element ion such as fluorine, chlorine, bromine, and iodine, or an inorganic or organic ion. Further, examples of the polar functional groups include also $-OH$, $-SH$, $-CN$, and an epoxy group.

(Lubricant)

It is favorable that the lubricant contains a compound represented by the following general formula (1) and a compound represented by the following general formula (2). In the case where the lubricant contains these compounds, it is possible to particularly reduce the dynamic friction coefficient of the surface of the magnetic layer 13. Therefore, it is possible to further improve the travelling property of the magnetic recording medium 1.

$$CH_3(CH_2)_nCOOH \tag{1}$$

(However, in the general formula (1), n represents an integer selected from the range of 14 or more and 22 or less.)

(However, in the general formula (2), p represents an integer selected from the range of 14 or more and 22 or less, and q represents an integer selected from the range of 2 or more and 5 or less.)

(Additive)

The magnetic layer 13 may further contain, as non-magnetic reinforcing particles, aluminum oxide (α, β, or γ alumina), chromium oxide, silicon oxide, diamond, garnet, emery, boron nitride, titanium carbide, silicon carbide, titanium carbide, titanium oxide (rutile-type or anatase-type titanium oxide), or the like.

[Non-Magnetic Layer 12]

The non-magnetic layer 12 contains a non-magnetic powder and a binder. The non-magnetic layer 12 may contain, as necessary, an additive such as conductive particles, a lubricant, a curing agent, and a rust inhibitor.

The thickness of the non-magnetic layer 12 is favorably 0.6 μm or more and 2.0 μm or less, more favorably 0.8 μm or more and 1.4 μm or less. The thickness of the non-magnetic layer 12 can be obtained by a method similar to the method of obtaining the thickness of the magnetic layer 13 (e.g., TEM). Note that the magnification of the TEM image is appropriately adjusted in accordance with the thickness of the non-magnetic layer 12.

(Non-Magnetic Powder)

The non-magnetic powder includes, for example, at least one of an inorganic particle powder or an organic particle powder. Further, the non-magnetic powder may contain a carbon material such as carbon black. Note that one type of non-magnetic powder may be used alone, or two or more types of non-magnetic powders may be used in combination. The inorganic particles include, for example, a metal, a metal oxide, a metal carbonate, a metal sulfate, a metal nitride, a metal carbide, or a metal sulfide. Examples of the shape of the non-magnetic powder include, but not limited to, various shapes such as a needle shape, a spherical shape, a cubic shape, and a plate shape.

(Binder)

The binder is similar to that in the magnetic layer 13 described above.

[Back Layer 14]

The back layer 14 contains a non-magnetic powder and a binder. The back layer 14 may contain, as necessary, an additive such as a lubricant, a curing agent, and an antistatic agent. As the non-magnetic powder and the binder, materials similar to those used in the above-mentioned non-magnetic layer 12 are used.

(Non-Magnetic Powder)

The average particle size of the non-magnetic powder is favorably 10 nm or more and 150 nm or less, more favorably 15 nm or more and 110 nm or less. The average particle size of the magnetic powder is obtained in a way similar to that for the average particle size D of the above-mentioned magnetic powder. The non-magnetic powder may include a non-magnetic powder having two or more particle size distributions.

The upper limit value of the average thickness of the back layer 14 is favorably 0.6 μm or less. In the case where the upper limit value of the average thickness of the back layer 14 is 0.6 μm or less, since the thickness of the non-magnetic layer 12 or the base material 11 can be kept thick even if the average thickness of the magnetic recording medium 1 is 5.6 μm, it is possible to maintain the travelling stability in the recording/reproduction device of the magnetic recording medium 1. The lower limit value of the average thickness of the back layer 14 is not particularly limited, but is, for example, 0.2 μm or more.

The average thickness of the back layer 14 is obtained as follows. First, the magnetic recording medium 1 having a ½ inch width is prepared and cut into a length of 250 mm to prepare a sample. Next, using a laser hologage manufactured by Mitsutoyo again as a measuring device, the thickness of the sample is measured at five or more points, and the measured values are simply averaged (arithmetically averaged) to calculate an average value $t_T$ [μm] of the magnetic recording medium 1. Note that the measurement positions are randomly selected from the sample. Subsequently, the back layer 14 of the sample is removed with a solvent such as MEK (methyl ethyl ketone) and dilute hydrochloric acid. After that, the thickness of the sample is measured at five or more points using the above-mentioned laser hologage, and the measured values are simply averaged (arithmetically averaged) to calculate an average value $t_B$ [μm] of the magnetic recording medium 1 from which the back layer 14 has been removed. Note that the measurement positions are randomly selected from the sample. After that, an average thickness $t_b$ [μm] of the back layer 14 is obtained from the following formula.

$$t_b[\mu m] = t_T[\mu m] - t_B[\mu m]$$

The back layer 14 has a surface in which a large number of protrusions are provided. The large number of protrusions are for forming a large number of holes in the surface of the magnetic layer 13 in the state where the magnetic recording medium 1 is wound in a roll shape. The large number of holes include, for example, a large number of non-magnetic particles protruding from the surface of the back layer 14.

In this description, the case where a large number of protrusions provided in the surface of the back layer 14 are transferred to the surface of the magnetic layer 13 to form a large number of holes in the surface of the magnetic layer 13 has been described. However, the method of forming a large number of holes is not limited thereto. For example, a large number of holes may be formed in the surface of the magnetic layer 13 by adjusting the type of solvent contained in the coating material for forming a magnetic layer and the drying condition of the coating material for forming a magnetic layer.

[Average Thickness of Magnetic Recording Medium]

The upper limit value of the average thickness (average total thickness) of the magnetic recording medium 1 is favorably 5.6 μm or less, more favorably 5.0 μm or less, more favorably 4.6 μm or less, and still more favorably 4.4 μm or less. In the case where the average thickness $t_T$ of the magnetic recording medium 1 is 5.6 μm or less, the recording capacity that can be recorded in the cartridges 21 can be made higher than that of a typical magnetic recording medium. The lower limit value of the average thickness of the magnetic recording medium 1 is not particularly limited, but is, for example, 3.5 μm or more.

The average thickness of the magnetic recording medium 1 is obtained by the procedure described in the above-mentioned method of obtaining the average thickness of the back layer 14.

(Coercive Force Hc)

The upper limit value of the coercive force Hc in longitudinal direction of the magnetic recording medium 1 is favorably 2,000 Oe or less, more favorably 1,900 Oe or less, and still more favorably 1,800 Oe or less.

In the case where the lower limit value of the coercive force Hc measured in the longitudinal direction of the magnetic recording medium 1 is favorably 1,000 Oe or more, demagnetization due to leakage flux from the recording head can be suppressed.

The above-mentioned coercive force Hc is obtained as follows. First, a measurement sample is cut out from the long magnetic recording medium 1, and the M-H loop of the entire measurement sample are measured in the longitudinal direction of the measurement sample (travelling direction of the magnetic recording medium 1) using a vibrating sample magnetometer (VSM). Next, the coating film (the non-magnetic layer 12, the magnetic layer 13, the back layer 14, and the like) is wiped off using acetone, ethanol, or the like, leaving only the base material 11 as a sample for background correction. The M-H loop of the base material 11 is measured in the longitudinal direction of the base material 11 (travelling direction of the magnetic recording medium 1) using VSM. After that, the M-H loop of the base material 11 is subtracted from the M-H loop of the entire measurement sample to obtain the background-corrected M-H loop. The coercive force Hc is obtained from the obtained M-H loop. Note that the above-mentioned measurement of the M-H loop is performed at 25° C. Further, "demagnetizing field correction" when the M-H loop is measured in the longitudinal direction of the magnetic recording medium 1 is not performed.

(Squareness Ratio)

A squareness ratio (degree of orientation) S1 in the perpendicular direction (thickness direction) of the magnetic recording medium 1 is 65% or more, favorably 70% or more, more favorably 75% or more, and more favorably 80% or more. In the case where the squareness ratio S1 is 65% or more, the perpendicular orientation of the magnetic powder becomes sufficiently high, and therefore, a more excellent SNR can be obtained.

The squareness ratio S1 is obtained as follows. First, a measurement sample is cut out from the long magnetic recording medium 1, and the M-H loop of the entire measurement sample corresponding to the perpendicular direction (thickness direction) of the magnetic recording medium 1 is measured using VSM. Next, the coating film (the non-magnetic layer 12, the magnetic layer 13 and the back layer 14, and the like) is wiped off using acetone, ethanol or the like, leaving only the base material 11 as a sample for background correction. The M-H loop of the base material 11 corresponding to the perpendicular direction of the base material 11 (perpendicular direction of the magnetic recording medium 1) is measured using VSM. After that, the M-H loop of the base material 11 is subtracted from the M-H loop of the entire measurement sample to obtain the background-corrected M-H loop. A saturation magnetization Ms (emu) and a residual magnetization Mr (emu) of the obtained M-H loop are substituted into the following formula to calculate the squareness ratio S1(%). Note that the above-mentioned measurement of the M-H loop is performed at 25° C. Further, "demagnetizing field correction" when the M-H loop is measured in the perpendicular direction of the magnetic recording medium 1 is not performed.

Squareness ratio $S1(\%) = (Mr/Ms) \times 100$

A squareness ratio S2 in the longitudinal direction (travelling direction) of the magnetic recording medium 1 is favorably 35% or less, more favorably 30% or less, and still more favorably 25% or less. In the case where the squareness ratio S2 is 35% or less, the perpendicular orientation of the magnetic powder becomes sufficiently high, and therefore, a more excellent SNR can be obtained.

The squareness ratio S2 is obtained in a way similar to that for the squareness ratio S1 except that the M-H loop is measured in the longitudinal direction (travelling direction) of the magnetic recording medium 1 and the base material 11.

(Dynamic Friction Coefficient)

In the case where a ratio $(\mu_B/\mu_A)$ of a dynamic friction coefficient $\mu_A$ between the surface of the magnetic layer 13 and the magnetic head when the tension applied to the magnetic recording medium 1 is 1.2 N and a dynamic friction coefficient $\mu_B$ between the surface of the magnetic layer 13 and the magnetic head when the tension applied to the magnetic recording medium 1 is 0.4 N is favorably 1.0 or more and 2.0 or less, the change in friction coefficient due to the tension fluctuation during travelling can be reduced, and thus, it is possible to stabilize the travelling of the tape.

A ratio $(\mu_{1000}/\mu_5)$ of a value µ5 at the fifth travelling and a value µ1000 at the 1,000th travelling of the dynamic friction coefficient $\mu_A$ between the surface of magnetic layer 13 and the magnetic head when the tension applied to the magnetic recording medium 1 is 0.6 N is favorably 1.0 or more and 2.0 or less, more favorably 1.0 or more and 1.5 or less. In the case where the ratio $(\mu_B/\mu_A)$ is 1.0 or more and 2.0 or less, the change in friction coefficient due to a large number of times of travelling can be reduced, and thus, the travelling of the tape can be stabilized.

[Data Band and Servo Band]

FIG. 2 is a schematic diagram of the magnetic recording medium 1 as viewed from above. Referring to FIG. 2, the magnetic layer 13 includes a plurality of data bands d (data bands d0 to d3) and a plurality of servo bands s (servo bands s0 to s4). The plurality of data bands d is long in the longitudinal direction (X axis direction), and data signals are to be written thereto. The plurality of servo bands s is long in the longitudinal direction, and the servo signal 6 is to be written thereto. The servo bands s are located at positions where the respective data bands d are sandwiched in the width direction (Y axis direction).

In the present technology, the ratio of the area of the servo band s to the area of the entire surface of the magnetic layer 13 is typically 4.0% or less. Further, the width of the servo band s is typically 95 µm or less.

Since the servo bands s are located at positions where the respective data bands d are sandwiched, the number of servo bands s is one more than the number of data bands d. In the example shown in FIG. 2, an example in which the number of data bands d is four and the number of servo bands s is five is shown (In existing systems, it is common to employ this approach).

The number of data bands d and the number of servo bands s can be changed as appropriate, and these numbers may be increased.

In this case, the number of servo bands s is favorably five or more. In the case where the number of servo bands s is five or more, the effect on the servo signal caused by the dimensional change of the magnetic recording medium 1 in the width direction can be suppressed, and stable recording/reproduction characteristics with fewer off-tracks can be ensured.

Further, the number of data bands d may be 8, 12, . . . , (i.e., 4n (n represents an integer greater than or equal to two)) and the number of servo bands s may be 9, 13, . . . (i.e., 4n+1 (n represents an integer greater than or equal to two). In this case, it is possible to cope with the change of the number of data bands d and the number of servo bands s without changing the existing systems.

The data band d includes a plurality of recording tracks 5 that is long in the longitudinal direction and aligned in the width direction. The data signals are recorded on the recording tracks 5 along the recording tracks 5. Note that in the present technology, the one-bit length in the longitudinal direction in the data signal to be recorded on the data band d is typically 48 nm or less. The servo band s includes a predetermined pattern of servo signal 6 to be recorded by a servo signal recording device (not shown).

Figure 3:
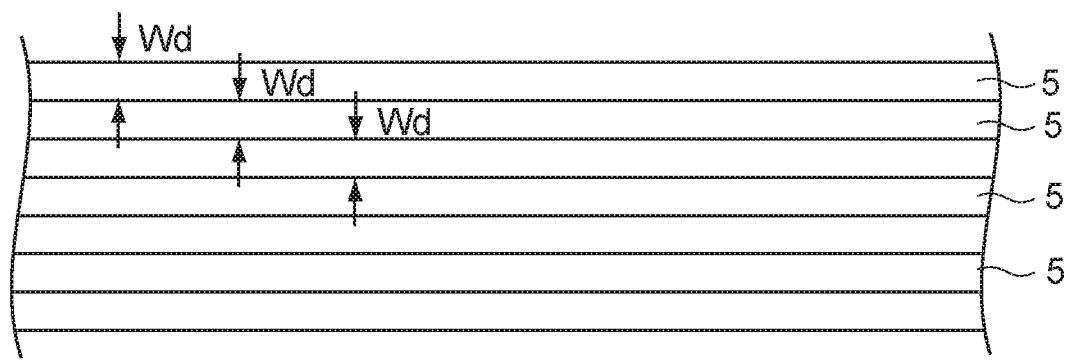
FIG. 3 is an enlarged view showing recording tracks in a data band.
Figure 3:
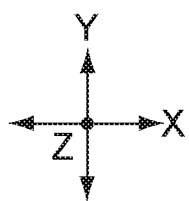

FIG. 3 is an enlarged view showing the recording tracks 5 in the data band d. As shown in FIG. 3, the recording tracks 5 are each long in the longitudinal direction, are aligned in the width direction, and each have a predetermined recording track width Wd for each track in the width direction. The recording track width Wd is typically 2.0 µm or less. Note that such a recording track width Wd can be measured by, for example, developing the magnetic recording medium 1 using a developer such as a ferricolloid developer and then observing the developed magnetic recording medium 1 by an optical microscopy.

The number of recording tracks 5 included in one data band d is, for example, approximately 1,000 to 2,000.

Figure 4:
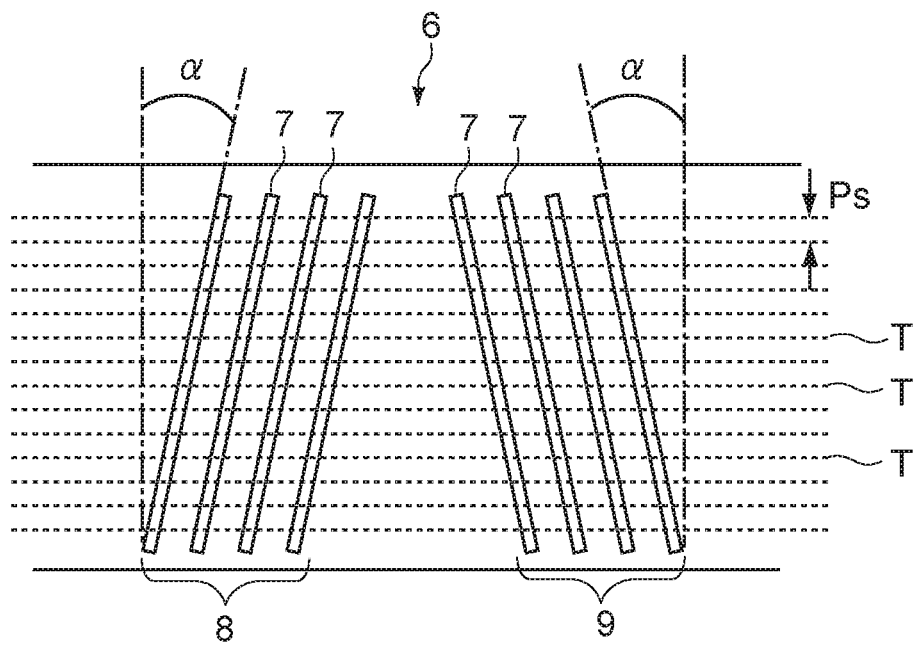
FIG. 4 is an enlarged view showing a servo signal in a servo band.
Figure 4:
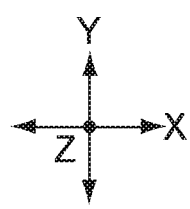

FIG. 4 is an enlarged view showing the servo signal 6 in the servo band s. As shown in FIG. 4, the servo signal 6 includes a plurality of stripes 7 inclined with a predetermined azimuth angle α with respect to the width direction (Y axis direction). The plurality of stripes 7 are classified into a first stripe group 8 inclined clockwise with respect to the width direction (Y-axis direction) and a second stripe group 9 inclined counterclockwise with respect to the width direction. The shape and the like of such a stripe 7 can be measured by, for example, developing the magnetic recording medium 1 using a developer such as a ferricolloid developer and then observing the developed magnetic recording medium 1 by an optical microscopy.

In FIG. 4, a servo trace line T, which is the line on which the servo signal 6 is traced, is shown by a dashed line (the servo signal 6 is to be traced by a servo read head 32, which will be described later). The servo trace line T is set along the longitudinal direction (X axis direction) and is set at a predetermined interval Ps in the width direction.

The number of servo trace lines T per servo band s is, for example, approximately 30 to 60.

The interval Ps between the two adjacent servo trace lines T is the same as the value of the recording track width Wd and is, for example, 2.0 µm or less. Here, the interval Ps of the two adjacent servo trace lines T is a value that determines the recording track width Wd. That is, when the interval Ps between the servo trace lines T is narrowed, the recording track width Wd becomes smaller, and the number of recording tracks 5 included in one data band d increases. As a result, the recording capacity of data increases (the opposite is true in the case where the interval Ps increases).

Data Recording Device 20

Figure 5:
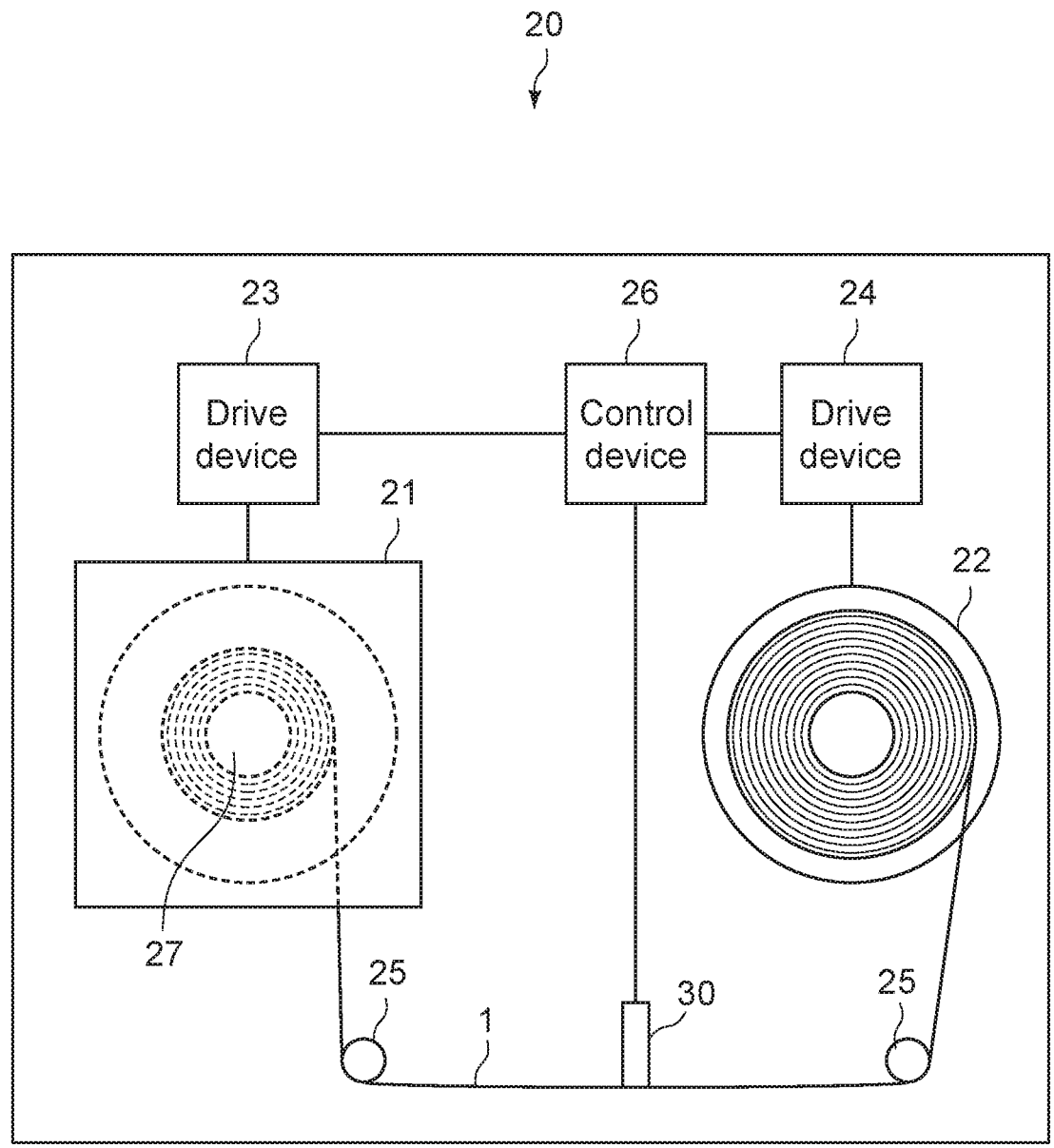
FIG. 5 is a schematic diagram showing a data recording device.

Next, a data recording device 20 for recording/reproducing data signals to/from the magnetic recording medium 1 will be described. FIG. 5 is a schematic diagram showing the data recording device 20. In the present specification (and the drawings), a coordinate system with reference to the data recording device 20 is represented by an X'Y'Z' coordinate system.

The data recording device 20 is configured to be capable of loading the cartridge 21 housing the magnetic recording medium 1. Note that although a case where the data recording device 20 is capable of loading one cartridge 21 will be described here for ease of description, the data recording device 20 may be configured to be capable of loading a plurality of cartridges 21.

As shown in FIG. 5, the data recording device 20 includes a spindle 27, a reel 22, a spindle driving device 23, a reel driving device 24, a plurality of guide rollers 25, a head unit 30, and a control device 26.

The spindle 27 is configured to be capable of loading the cartridge 21. The cartridge 21 complies with the LTO (Linear Tape Open) standard and rotatably houses the wound magnetic recording medium 1 inside the case. The reel 22 is configured to be capable of fixing the leading end of the magnetic recording medium 1 pulled out from the cartridge 21.

The spindle driving device 23 causes, in response to a command from the control device 26, the spindle 27 to rotate. The reel driving device 24 causes, in response to a command from the control device 26, the reel 22 to rotate. When data signals are recorded/reproduced on/from the magnetic recording medium 1, the spindle driving device 23 and the reel driving device 24 respectively cause the spindle 27 and the reel 22 to rotate, thereby causing the magnetic recording medium 1 to travel. The guide roller 25 is a roller for guiding the travelling of the magnetic recording medium 1.

The control device 26 includes, for example, a control unit, a storage unit, a communication unit, and the like. The control unit includes, for example, a CPU (Central Processing Unit) and the like, and integrally controls the respective units of the data recording device 20 in accordance with a program stored in the storage unit.

The storage unit includes a non-volatile memory on which various types of data and various programs are to be recorded, and a volatile memory used as a work area of the control unit. The above-mentioned various programs may be read from a portable recording medium such as an optical disk and a semiconductor memory, or may be downloaded from a server device on a network. The communication unit is configured to be capable of communicating with other devices such as a PC (Personal Computer), and a server device.

The head unit 30 is configure to be capable of recording, in response to a command from the control device 26, a data signal to the magnetic recording medium 1. Further, the head unit 30 is configured to be capable of reproducing data written to the magnetic recording medium 1 in response to a command from the control device 26.

Figure 6:
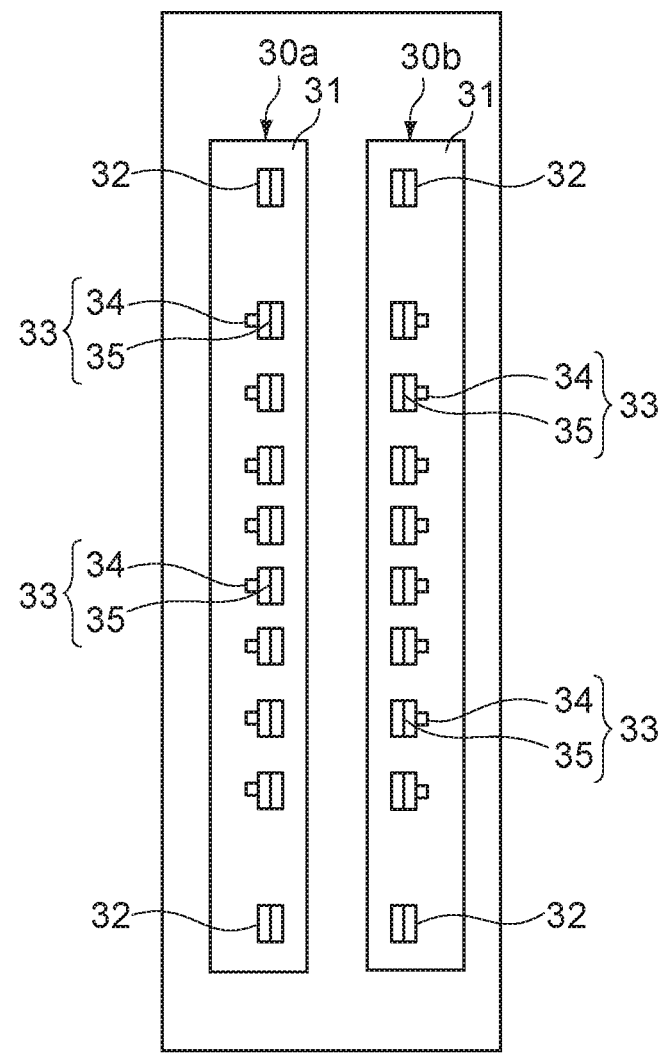
FIG. 6 is a diagram of a head unit as viewed from below.
Figure 6:
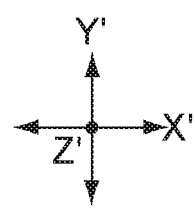

FIG. 6 is a diagram of the head unit 30 as viewed from below. As shown in FIG. 6, the head unit 30 includes a first head unit 30a and a second the head unit 30b. The first head unit 30a and the second head unit 30b are symmetrically configured in the X' axis direction (traveling direction of the magnetic recording medium 1). The first head unit 30a and the second head unit 30b are configured to be movable in the width direction (Y' axis direction).

The first head unit 30a is a head used when the magnetic recording medium 1 travels in the forward direction (flow direction from the cartridge 21 side to the device 20 side). Meanwhile, the second head unit 30b is a head used when the magnetic recording medium 1 travels in the opposite direction (flow direction from the device 20 side to the cartridge 21 side).

Since the first head unit 30a and the second head unit 30b have basically the same configuration, the first head unit 30a will be typically described.

The first head unit 30a includes a unit body 31, two servo read heads 32, and a plurality of the data write/read heads 33.

The servo read head 32 is configured to be capable of reproducing the servo signal 6 by reading the magnetic field generated from the servo signal 6 recorded on the magnetic recording medium 1 by an MR device (MR: Magneto Resistive) or the like. The servo read heads 32 are provided one by one on each end side in the width direction (Y' axis direction) in the unit body 31. The interval in the width direction (Y' axis direction) of the two servo read heads 32 is substantially the same as the distance between adjacent servo bands s in the magnetic recording medium 1.

The data write/read heads 33 are disposed along the width direction (Y-axis direction) at equal intervals. Further, the data write/read head 33 is disposed at a position sandwiched between the two servo read heads 32. The number of the data write/read heads 33 is, for example, approximately 20 to 40, but this number is not particularly limited.

The data write/read head 33 includes a data write head 34 and a data read head 35. The data write head 34 is configured to be capable of recording data signals on the magnetic recording medium 1 by a magnetic field generated from a magnetic gap. Further, the data read head 35 is configured to be capable of reproducing data signals by reading the magnetic field generated from a data signal recorded on the magnetic recording medium 1 by an MR device (MR: Magneto Resistive) or the like.

In the first head unit 30a, the data write head 34 is disposed on the left side of the data read head 35 (upstream side when the magnetic recording medium 1 flows in the forward direction). Meanwhile, in the second head unit 30b, the data write head 34 is disposed on the right side of the data read head 35 (upstream side when the magnetic recording medium 1 flows in the opposite direction). Note that the data read head 35 is capable of reproducing a data signal immediately after the data write head 34 writes the data signal to the magnetic recording medium 1.

Figure 7:
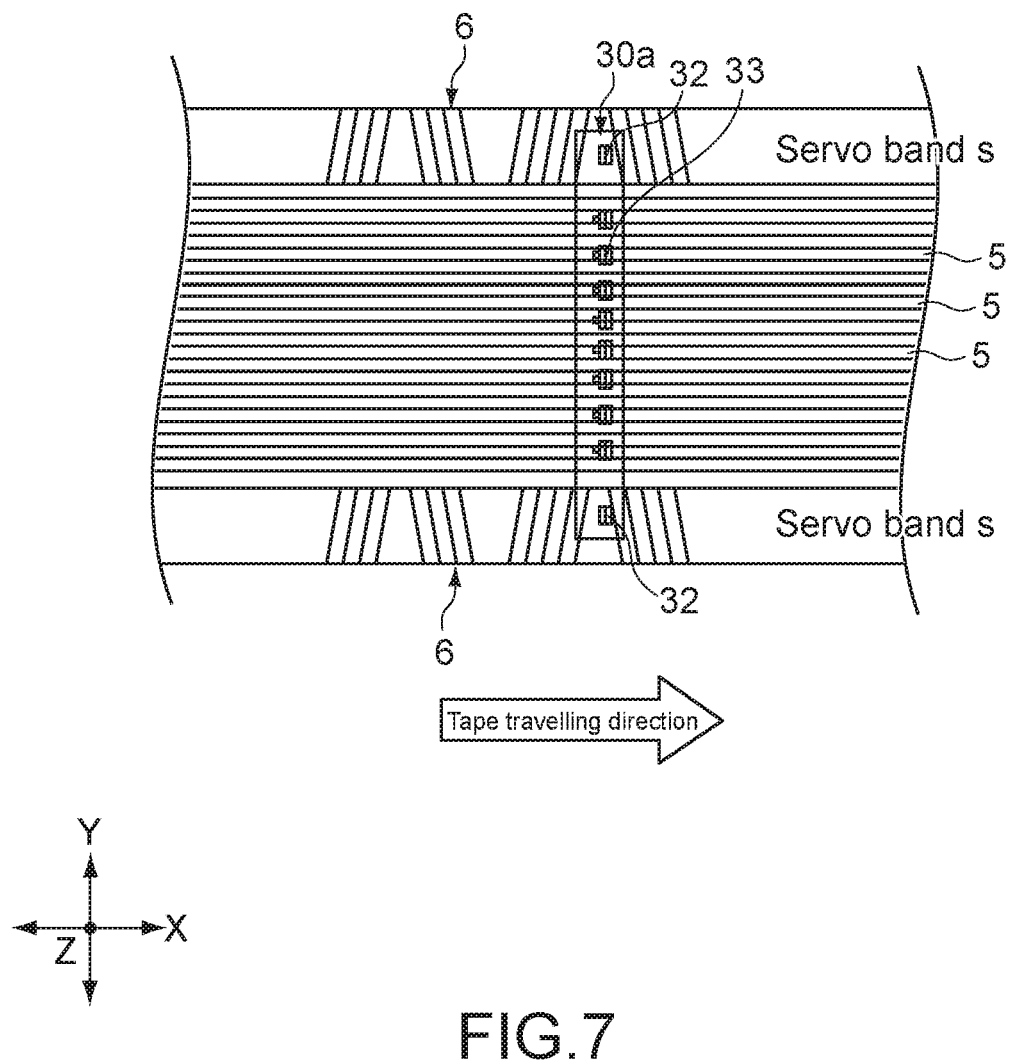
FIG. 7 is a diagram showing the state when a first head unit performs recording/reproduction of a data signal.

FIG. 7 is a diagram showing the state when the first head unit 30a performs recording/reproduction of a data signal. Note that in the example shown in FIG. 7, a state where the magnetic recording medium 1 is caused to travel in the forward direction (flow direction from the cartridge 21 side to the device 20 side) is shown.

As shown in FIG. 7, when the first head unit 30a performs recording/reproduction of data signals, one servo read head 32 of the two servo read heads 32 is located on one servo band s of the two adjacent servo bands s to reproduce the servo signal 6 on this servo band s.

The other servo read head 32 of the two servo read heads 32 is located on the other servo band s of the two adjacent servo bands s and reproduces the servo signal 6 on this servo band s.

Further, at this time, the control device 26 determines, on the basis of the reproduced waveform of the servo signal, whether or not the servo read head 32 accurately traces on the target servo trace line T (See FIG. 4).

This principle will be described. As shown in FIG. 4, the direction inclined with respect to the width direction (Y axis direction) is reversed between the first stripe group 8 and the second stripe group 9 in the servo signal 6. For this reason, in the upper servo trace line T, the distances between the first stripe group 8 and the second stripe group 9 in the longitudinal direction (X-axis direction) are relatively small. Meanwhile, on the lower servo trace line T, the distances between the first stripe group 8 and the second stripe group 9 the in longitudinal direction (X axis direction) are relatively wide.

Therefore, by obtaining the difference between the time at which the reproduced waveform of the first stripe group 8 has been detected and the time at which the reproduced waveform of the second stripe group 9 has been detected, the current position of the servo read head 32 in the width direction (Y axis direction) relative to the magnetic recording medium 1 can be known.

Accordingly, the control device 26 is capable of determining, on the basis of the reproduced waveform of the servo signal, whether or not the servo read head 32 accurately traces on the target servo trace line T. Then, the control device 26 causes, in the case where the servo read head 32 does not accurately trace on the target servo trace line T, the head unit 30 to move in the width direction (Y' axis direction) to adjust the position of the head unit 30.

Referring to FIG. 7 again, the data write/read head 33 records data signals on the recording tracks 5 along the recording tracks 5 while the position of the data write/read head 33 in the width direction is adjusted (when shifted).

Here, when the magnetic recording medium 1 is completely pulled out of the cartridge 21, then, the magnetic recording medium 1 is caused to travel in the opposite direction (flow direction from the device 20 side to the cartridge 21 side). At this time, the second head unit 30b is used as the head unit 30.

Further, at this time, as the servo trace line T, the servo trace line T adjacent to the previously used servo trace line T is used. In this case, the head unit 30 is caused to move in the width direction (Y' axis direction) by the interval Ps of the servo trace line T (=by the amount corresponding to the recording track width Wd).

Further, in this case, the data signal is recorded on the recording track 5 adjacent to the recording track 5 on which the data signal has been previously recorded.

In this way, data signals are recorded on the recording track 5 while the magnetic recording medium 1 is reciprocated many times with the traveling direction thereof being changed between the forward direction and the reverse direction.

Here, for example, assumption is made that the number of servo trace lines T is 50 and the number of data write/read heads 33 included in the first head unit 30a (or the second head unit 30b) is 32. In this case, the number of recording tracks 5 included in one data band d is 50×32, i.e., 1,600. Thus, in order to record data signals in all of the recording tracks 5, the magnetic recording medium 1 needs to be reciprocated 25 times.

Basic Concept of Present Technology

Next, a basic idea of the present technology will be described. The present technology focuses on the full width at half maximum (PW50) of an isolated waveform in a reproduced waveform of a servo signal. First, this full width at half maximum of the isolated waveform will be described.

Figure 8:
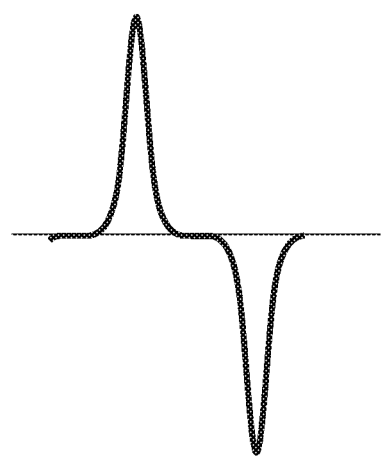
FIG. 8 is a diagram showing a reproduced waveform when reading one stripe in the servo signal.

FIG. 8 is a diagram showing a reproduced waveform when one stripe 7 in the servo signal 6 is read. As shown in FIG. 8, the reproduced waveform when one stripe 7 is read protrudes toward the plus and minus sides (due to reading of the N pole and the S pole). The isolated waveform is basically half of this.

Figure 9:
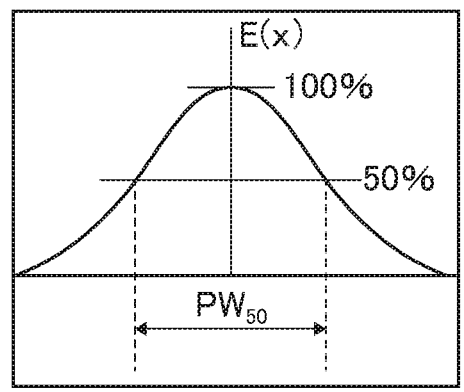
FIG. 9 is a diagram for describing a full width at half maximum in the isolated waveform.

FIG. 9 is a diagram for describing the full width at half maximum in the isolated waveform. As shown in FIG. 9, the full width at half maximum is the width of the waveform at the height of half (50%) of the maximum value (100%) in the reproduced waveform of the servo signal 6.

This full width at half maximum is a value representing the sharpness of the peak in the reproduced waveform of the servo signal 6. That is, the narrower the full width at half maximum, the sharper the peak in the reproduced waveform. Conversely, the broader the full width at half maximum, the less the sharpness of the peak in the reproduced waveform.

Figure 10:
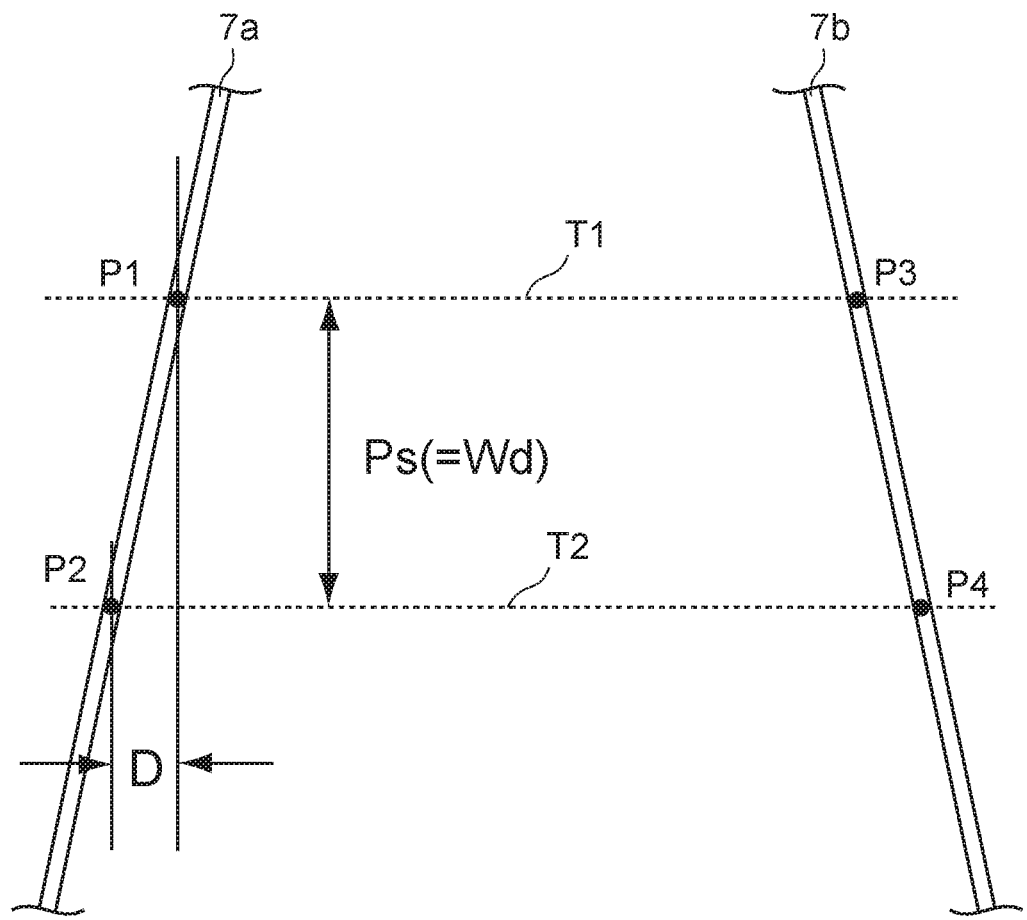
FIG. 10 is a diagram for describing the basic concept of the present technology, and a diagram showing two stripes in the servo signal.

FIG. 10 is a diagram for describing the basic concept of the present technology and is a diagram showing two stripes 7 in the servo signal 6.

Referring to FIG. 10, among the plurality of stripes 7 included in the first stripe group 8 of the servo signal 6, an arbitrary stripe 7 is defined as a first stripe 7a. Further, among the plurality of stripes 7 included in the second stripe group 9 of the servo signal 6, an arbitrary stripe 7 is defined as a second stripe 7b.

Further, among the plurality of servo trace lines T, an arbitrary servo trace line T is defined as a first servo trace line T1. Further, the servo trace line T adjacent to the first servo trace line T1 is defined as a second servo trace line T2.

The intersection of the first stripe 7a and the first servo trace line T1 is denoted by P1. Note that regarding this point P1, an arbitrary point on the first stripe 7a may be used as the point P1.

The intersection of the first stripe 7a and the second servo trace line T2 is denoted by P2. Note that regarding this point P2, a point on the first stripe 7a located at a position apart from the P1 by the interval Ps (i.e., by the amount corresponding to the recording track width Wd) in the widthwise direction (Y-axis direction) may be used as the point P2.

Further, the distance in the longitudinal direction (X axis direction) between the points P1 and P2 is defined as a distance D.

Further, the intersection of the second stripe 7b and the first servo trace line T1 is denoted by P3, and the intersection of the second stripe 7b and the second servo trace line T2 is denoted by P4.

When the first servo trace line T1 is traced, the difference between the time at which the reproduced waveform has been detected at the point P1 and the time at which the reproduced waveform has been detected at the point P3 needs to be determined. This difference is defined as a first period.

Similarly, when the second trace line T is traced, the difference between the time at which the reproduced waveform has been detected at the point P2 and the time at which the reproduced waveform has been detected at the point P4 needs to be determined. This difference is defined as the second period.

Next, a difference between the first period and the second period will be considered. Here, assumption is made that the interval Ps between the servo trace lines T and the recording track width Wd are 1.56 μm and the azimuth angle α is 12 degrees. In this case, the distance D is 1.56×tan 12 degrees, i.e., 0.33 μm. The difference between the distance between the points P1 and P3 and the distance between the points P2 and P4 is 0.66 μm because it is twice the distance D.

At this time, in the case where the traveling velocity of the magnetic recording medium 1 is 5 m/s, 0.66/5,000,000, i.e., 0.13 μs is obtained. This is the difference between the first period and the second period.

That is, in order to accurately trace the first servo trace line T1 and the second servo trace line T2, it is necessary to accurately determine a minute difference of 0.13 μs (If this is not possible, a data signal is recorded on the adjacent recording track 5).

However, in the case where the sharpness of the peak in the reproduced waveform of the servo signal 6 (see FIG. 8) is blunt, such a small difference cannot be accurately determined. In particular, in the case where the recording track width Wd is reduced and the interval Ps between the servo trace lines T is reduced in order to increase the number of recording tracks 5, the distance D is further narrowed and the difference between the first period and the second period is further reduced.

In this regard, in the present technology, the degree of perpendicular orientation of the magnetic layer 13 is set to be equal to or greater than a certain value so that the peak in the reproduced waveform of the servo signal 6 is sharp, and the full width at half maximum of the isolated waveform in the reproduced waveform of the servo signal 6 is set to be equal to or less than a certain value.

Note that it has been found that by setting the degree of perpendicular orientation of the magnetic layer 13 to 65% or more and the full width at half maximum of the isolated waveform to 195 nm, the peak in the reproduced waveform of the servo signal 6 is sharp enough to distinguish the small difference (e.g., 0.13 μs) as described above (see Examples below).

Various Examples and Various Comparative Examples

Next, various Examples and various Comparative Examples in the present technology will be described. FIG. 11 is a diagram showing various Examples and various Comparative Examples.

First, the magnetic recording medium 1 according to a First Example is prepared as a reference magnetic recording medium 1. In the other Examples and other Comparative Examples, various values such as the degree of perpendicular orientation were changed with respect to the First Example.

As shown in FIG. 11, in the First Example, the degree of perpendicular orientation of the magnetic layer 13 was 65% and the degree of degree of longitudinal orientation of the magnetic layer 13 was 35%. In the First Example, the ratio (see FIG. 10) of the distance D to the recording track width Wd (interval Ps between the servo trace lines T) was 21.3%. Note that this ratio is related to the azimuth angle α (see FIG. 4) and is equal to a value in which tan a is expressed as %. In the First Example, the azimuth angle α was 12°.

In the First Example, the distance D (see FIG. 10) was 0.12 μm and the recording track width Wd (interval Ps between the servo trace lines T) was 0.56 μm. Further, in the First Example, as the magnetic powder contained in the magnetic layer 13, hexagonal plate-shaped barium ferrite was used.

In the First Example, the full width at half maximum of the isolated waveform in the reproduced waveform of the servo signal 6 was 180 nm. Note that the full width at half maximum of the isolated waveform can be obtained, for example, as follows. First, averaging (synchronous averaging) is performed using a digital-storage oscilloscope under the conditions of, for example, sampling: 500 Ms/s (2 nsec/point) and the number of samplings: 50,000 points). Then, the full width at half maximum of the isolated waveform is calculated from the obtained isolated reproduced waveform. Note that in the synchronous averaging, alignment is performed at the peak position in the waveform.

Further, in the First Example, the magnetic powder contained in the magnetic layer 13 had a plate shape, and the aspect ratio in the magnetic powder was 2.8. Further, the particle volume (average volume Vave) of the magnetic powder was a 1950 nm³. Further, the thickness of magnetic layer 13 was 80 nm.

In a Second Example, the degree of perpendicular orientation of the magnetic layer 13 was increased to 66% compared to the First Example. Further, the degree of degree of longitudinal orientation of the magnetic layer 13 was reduced to 31%. In the Second Example, since the degree of perpendicular orientation of the magnetic layer 13 was higher than that in the First Example (the degree of longitudinal orientation was reduced), the full width at half maximum of the isolated waveform was narrower than that in the First Example and was 160 nm. The other points are the same as those in the First Example.

In a Third Example, the degree of perpendicular orientation of the magnetic layer 13 was further increased to 70%, which is higher than that in the Second Example. Further, the degree of degree of longitudinal orientation of the magnetic layer 13 was further reduced to 29%. In the Third Example, since the degree of perpendicular orientation of the magnetic layer 13 was further increased to be higher than that in the Second Example (the degree of longitudinal orientation was further reduced), the full width at half maximum of the isolated waveform was narrower than that of the Second Example and was 150 nm. Note that the other points are the same as those in the First Example.

In a Fourth Example, the degree of perpendicular orientation of the magnetic layer 13 was further increased to 71%, which is higher than that in the Third Example. Further, the degree of degree of longitudinal orientation of the magnetic layer 13 was further reduced to 25%. In the Fourth Example, since the degree of perpendicular orientation of the magnetic layer 13 was further increased to be higher than that in the Third Example (the degree of longitudinal orientation was further reduced), the full width at half maximum of the isolated waveform was narrower than that in the Third Example and was 140 nm. The other points are the same as those in the First Example.

In a Fifth Example, the degree of perpendicular orientation of the magnetic layer 13 was 66% and the degree of degree of longitudinal orientation of the magnetic layer 13 was 31%. Note that the degree of perpendicular orientation and the degree of longitudinal orientation in the Fifth to Eighteenth Examples are the same as those in the Second Example.

Further, in the Fifth Example, the azimuth angle α (see FIG. 4) of the servo signal 6 is different from those in the First to Fourth Examples, and the azimuth angle α is 24 degrees. Due to this, in the Fifth Example, the distance D (see FIG. 10) is different from that in the First Example to the Fourth Example, and is 0.25 μm. In the Fifth Example, the ratio (see FIG. 10) of the distance D to the recording track width Wd (interval Ps between the servo trace lines T) is different from that in the First to Fourth Examples, and is 44.5%.

In the Fifth Example, the degree of perpendicular orientation and the degree of longitudinal orientation are the same as those in the Second Example. However, since the azimuth angle α of the servo signal 6 was increased, the full width at half maximum of the isolated waveform was increased to be higher than that in the Second Example and was 180 nm. The other points are the same as those in the First Example.

In a Sixth Example, the recording track width Wd (interval Ps between the servo trace lines T) was increased to 1.21 μm, which is higher than that in the Fifth Example. Further, due to this, the distance D was increased to 0.54 μm in the Sixth Example, which is higher than that in the Fifth Example. The other points are the same as those in the Fifth Example.

In a Seventh Example, the recording track width Wd (interval Ps between the servo trace lines T) was reduced to 0.38 μm, which is narrower than that in the Fifth Example. Further, due to this, the distance D was reduced to 0.17 μm in in the Seventh Example, which is narrower than that in the Fifth Example. The other points are the same as those in the Fifth Example.

Note that even if the recording track width Wd (interval Ps between the servo trace lines T) is changed, the full width at half maximum of the isolated waveform does not change unless the degree of perpendicular orientation, the azimuth angle α, and the like do not change (the full width at half maximum in the Sixth and Seventh Examples is the same as that in the Fifth Example, i.e., 180 nm).

In an Eighth Example, the degree of perpendicular orientation of the magnetic layer 13 was 66% and the degree of degree of longitudinal orientation of the magnetic layer 13 was 31%. Further, in the Eighth Example, the azimuth angle α (see FIG. 4) of the servo signal 6 is different from that in the First Example to the Seventh Example, and the azimuth angle α is 18 degrees.

Due to this, in the Eighth Example, the ratio (see FIG. 10) of the distance D to the recording track width Wd (interval Ps between the servo trace lines T) is different from the First Example to the Seventh Example, and is set to 32.5%.

Further, in the Eighth Example, the recording track width Wd (interval Ps between the servo trace lines T) was also different from those in the First Example to the Seventh Example, and was 1.66 μm. In the Eighth Example, the distance D (see FIG. 10) is 0.54 μm. Then, in the Eighth Example, the full width at half maximum of the isolated waveform was 170 μm.

In a Ninth Example, the recording track width Wd (interval Ps between the servo trace lines T) was reduced to 0.77 μm, which is narrower than that in the Eighth Example. Further, due to this, the distance D was reduced to 0.25 μm in the Ninth Example, which is narrower than that in the Eighth Example. The other points are the same as those in the Eighth Example.

In a Tenth Example, the recording track width Wd (interval Ps between the servo trace lines T) was further to 0.52 μm, which is narrower than that in the Ninth Example. Due to this, the distance D was further reduced to 0.17 μm in the Tenth Example, which is narrower than that in the Ninth Example. The other points are the same as those in the Ninth Example.

Note that even if the recording track width Wd (interval Ps between the servo trace lines T) is changed, the full width at half maximum of the isolated waveform does not change unless the degree of perpendicular orientation, the azimuth angle α, and the like do not change (the full width at half maximum in the Ninth and Tenth Examples is 170 nm, which is the same as that in the Eighth Example).

In Eleventh Example to Fourteenth Example, the same magnetic recording medium 1 as the magnetic recording medium 1 used in the Second Example is used to vary the recording track width Wd (interval Ps between the servo trace lines T). Specifically, in the Eleventh Example, the recording track width Wd (interval Ps between the servo trace lines T) was 2.91 μm and the distance D was 0.62 μm.

Further, in the Twelfth Example, the recording track width Wd (interval Ps between the servo trace lines T) was 1.55 μm and the distance D was 0.33 μm. Further, in the Thirteenth Example, the recording track width Wd (interval Ps between the servo trace lines T) was 0.56 µm and the distance D was 0.12 µm. Further, in the Fourteenth Example, the recording track width Wd (interval Ps between the servo trace lines T) was 0.38 µm and the distance D was 0.08 µm.

Note that even if the recording track width Wd (interval Ps between the servo trace lines T) is changed, the full width at half maximum of the isolated waveform does not change unless the degree of perpendicular orientation, the azimuth angle α, and the like do not change (the full width at half maximum in the Eleventh to Fourteenth Examples is 160 nm, which is the same as that in the Second Example).

In Fifteenth Example to Eighteenth Example, the components of the magnetic powder contained in the magnetic layer 13 are different from those in the Second Example. However, the other points are the same as those in the Second Example.

In the Fifteenth Example, a hexagonal plate-shaped strontium ferrite was used as the magnetic powder. The aspect ratio of the magnetic powder was three. In the Sixteenth Example, spherical ε-iron oxide particles were used as the magnetic powder. The aspect ratio of the magnetic powder was 1.1.

In the Seventeenth Example, spherical gallium ferrite was used as the magnetic powder. The aspect ratio of the magnetic powder was one. In the Eighteenth Example, cubic cobalt-containing ferrite was used as the magnetic powder. The aspect ratio of the magnetic powder was 1.7.

In the Fifteenth Example to the eighteenth Example (and the Second Example), the components of the magnetic powder contained in the magnetic layer 13 are different from each other. However, since the degree of perpendicular orientation (66%), the azimuth angle (12°) and the like are the same, the full width at half maximum of the isolated waveform has the same value (160 nm).

In a First Comparative Example and a Second Comparative Example, since the degree of perpendicular orientation is low (55%, 61%) and the degree of longitudinal orientation is high (46%, 40%), the full width at half maximum of the isolated waveform is wide, i.e., 220 nm, 200 nm. In the First Comparative Example and the Second Comparative Example, since the peak in the reproduced waveform of the servo signal 6 is dull, it is presumably difficult to accurately determine, in the case where the difference between the first period and the second period is small (the distance D is small), this difference (or distance D).

Meanwhile, in the First Example to the Eighteenth Example, since the degree of perpendicular orientation is high (65% or more) and the degree of longitudinal orientation is low (35% or less), the full width at half maximum of the isolated waveform is narrowed (to 195 nm or less). Therefore, in the First Example to the Eighteenth Example, since the peak in the reproduced waveform of the servo signal 6 is sharp, even if the difference between the first period and the second period is small (the distance D is small), this difference (or the distance D) can be accurately determined.

Meanwhile, in the Third Comparative Example since the degree of perpendicular orientation is high (66%) and the degree of longitudinal orientation is low (31%), the full width at half maximum of the isolated waveform is narrow and 160 nm. However, in the Third Comparative Example the recording track width Wd (interval Ps between the servo trace lines T) is too narrow, the distance D is too small, and the difference between the first period and the second period is too small.

For this reason, in the Third Comparative Example, even if the full width at half maximum of the isolated waveform is an appropriate value, since the difference between the first period and the second period is too small (the distance D is too small), this difference (or the distance D) cannot be determined and the system has failed.

For this reason, typically, the value of the distance D is set to 0.08 µm or more.

FIG. 12 is a diagram showing still other various Examples and various Comparative Examples.

In a Nineteenth Example, the degree of perpendicular orientation of the magnetic layer 13 was further increased to 75%, which is higher than that in the Fourth Example. The degree of degree of longitudinal orientation of the magnetic layer 13 was further reduced to 23%. Note that the other points are the same as those in the Fourth Example (First Example). In the Nineteenth Example, since the degree of perpendicular orientation of the magnetic layer 13 was further increased to be higher than that in the Fourth Example (the degree of longitudinal orientation was further reduced), the full width at half maximum of the isolated waveform was reduced to 138 nm, which is narrower than that in the Fourth Example.

In a Twentieth Example, the degree of perpendicular orientation of the magnetic layer 13 was further increased to 80%, which is higher than that in the Nineteenth Example. Further, the degree of degree of longitudinal orientation of the magnetic layer 13 was further reduced to 21%. Note that the other points are the same as those in the Nineteenth Example (First Example). In the Twentieth Example, since the degree of perpendicular orientation of the magnetic layer 13 was further increased to be higher than that in the Nineteenth Example (the degree of longitudinal orientation was further reduced), the full width at half maximum of the isolated waveform was 130 nm, which is narrower than that in the Nineteenth Example.

In a Twenty-First Example, the degree of perpendicular orientation of the magnetic layer 13 was further increased to 85%, which is higher than that in the Twentieth Example. Further, the degree of degree of longitudinal orientation of the magnetic layer 13 was further reduced to 18%. The other points are the same as those in the Twentieth Example (First Example). In the Twenty-First Example, since the degree of perpendicular orientation of the magnetic layer 13 was further increased to be higher than that in the Twentieth Example (the degree of longitudinal orientation was further reduced), the full width at half maximum of the isolated waveform was 119 nm, which is narrower than that in the Twentieth Example.

In a Twenty-Second Example, the particle volume (average volume Vave) of the magnetic powder was reduced to 1,600 nm$^3$, which is smaller than that in the First Example. The other points are the same as those in the First Example. In the Twenty-Second Example, since the particle volume was smaller than that in the First Example, the full width at half maximum of the isolated waveform was 130 nm, which is smaller than that in the First Example. Note that the full width at half maximum of the isolated waveform is narrowed when the particle volume of the magnetic powder is reduced is because the magnetization transition region is narrowed.

In a Twenty-Third Example, the particle volume (average volume Vave) of the magnetic powder was further reduced to 1,300 nm$^3$, which is smaller than that in the Twenty-Second Example. Note that the other points are the same as those in the Twenty-Second Example (First Example). In the Twenty-Third Example, since the particle volume was smaller than in that in Twenty-Second Example, the full width at half maximum of the isolated waveform was 125 nm, which is further narrower than that in Twenty-Second Example.

In a Twenty-Fourth Example, similarly to the Nineteenth Example, the degree of perpendicular orientation of the magnetic layer 13 was 75% and the degree of longitudinal orientation of the magnetic layer 13 was 23%. Meanwhile, in the Twenty-Fourth Example, the thickness of the magnetic layer 13 was reduced to 60 nm, which is smaller than that in the Nineteenth Example (First Example). Note that the other points are the same as in those the Nineteenth Example (First Example). In the Twenty-Fourth Example, since the thickness of the magnetic layer 13 was reduced to be thinner than that in the Nineteenth Example, the full width at half maximum of the isolated waveform was 120 nm, which is narrower than that in the Nineteenth Example.

In a Twenty-Fifth Example, the degree of perpendicular orientation of the magnetic layer 13 was further increased to 80%, which is higher than that in the Twenty-Fourth Example. Further, the degree of longitudinal orientation of the magnetic layer 13 was further reduced to 21%. Further, in the Twenty-Fifth Example, the thickness of the magnetic layer 13 was further reduced to 40 nm, which is thinner than that in the Twenty-Fourth Example. Note that the other points are the same as those in the Twenty-Fourth Example (First Example).

Here, the conditions of the Twenty-Fifth Example are the same as those in the Twentieth Example except that the thickness of the magnetic layer 13 is reduced from 80 nm to 40 nm. In the Twenty-Fifth Example, since the thickness of the magnetic layer 13 was reduced to be smaller than that in the Twentieth Example, the full width at half maximum of the isolated waveform was narrowed to 100 nm.

In the case where the thickness of the magnetic layer 13 is 90 nm or less, it is presumed that the value of the full width at half maximum of the isolated waveform in the reproduced waveform of the servo signal 6 can be reduced (to 195 nm or less), and the peak in the reproduced waveform can be sharpened.

In a Fourth Comparative Example, the particle volume of the magnetic powder was increased to 2500 nm$^3$, which is larger than that in the First Example. The other points are the same as those in the First Example. In the Fourth Comparative Example, since the particle volume of the magnetic powder was larger than that in the First Example, the full width at half maximum of the isolated waveform was increased to 210 nm, which is wider than that in the First Example. The value of this full width at half maximum (210 nm) has been widened and is not within the appropriate range (195 nm or less).

In a Fifth Comparative Example, the particle volume of the magnetic powder was increased to 2,800 nm$^3$, which is larger than that in the Fourth Comparative Example. The other points are the same as those in the Fourth Comparative Example (First Example). In the Fifth Comparative Example, since the particle volume of the magnetic powder was larger than that in the Fourth Comparative Example, the full width at half maximum of the isolated waveform was increased to 220 nm, which is wider than that in the Fourth Comparative Example. The value of this full width at half maximum (220 nm) has been widened and is not within the appropriate range (95 nm or less).

Note that in the case where the particle volume of the magnetic powder is 2,300 nm$^3$ or less, it is presumed that the full width at half maximum of the isolated waveform in the reproduced waveform of the servo signal 6 can be reduced (to 195 nm or less), and the peak in the reproduced waveform can be sharpened.

Effects

As described above, in the present technology, the degree of perpendicular orientation of the magnetic layer 13 is 65% or more, and the full width at half maximum of the isolated waveform in the reproduced waveform of the servo signal 6 is 195 nm or less (see the First Example to the Twenty-Fifth Example). As a result, the peak in the reproduced waveform of the servo signal 6 is sharpened. Further, even if the difference between the first period and the second period is small (the distance D is small), this difference (or the distance D) can be accurately determined.

Even if the difference between the first period and the second period is small (the distance D is small), this difference (or the distance D) can be accurately determined as described above, and thus, the interval Ps between the servo trace lines T can be reduced and the recording track width Wd can be reduced. Therefore, the number of recording tracks 5 included in one data band d can be increased. As a result, the recording density of data can be further improved.

Here, the narrower the full width at half maximum of the isolated waveform, the sharper the peak in the reproduced waveform of the servo signal 6, thereby improving the accuracy of reading the servo signal 6. Therefore, the full width at half maximum of the isolated waveform may be 180 nm or less (see the First Example to the Twenty-Fifth Example), 160 nm or less (see the Second to Fourth and Eleventh to Twenty-Fifth Examples), 140 nm or less (see the Fourth and Nineteenth to Twenty-Fifth Examples), 120 nm or less (see the Twenty-Frist, Twenty-Fourth, and Twenty-Fifth Examples), or the like.

Further, the higher the degree of perpendicular orientation of the magnetic layer 13, the narrower the full width at half maximum of the isolated waveform. Therefore, the degree of perpendicular orientation may be 70% or more (see the Third to Fourth, Nineteenth to Twenty-First, and Twenty-Fourth to Twenty-Fifth Examples), 75% or more (see the Nineteenth to Twenty-First and Twenty-Fourth to Twenty-Fifth Examples), 80% or more (see the Twenty to Twenty-One and Twenty-Fifth Examples), or the like.

Further, in the present technology, the distance D (distance between the positions P1 and P2 in the longitudinal direction) is 0.08 μm or more (see the First Example to the Twenty-Fifth Example: see, particularly, the Fourteenth Example). As a result, it is possible to prevent the system from failing.

Note that the present technology is advantageously applied to a case where the distance D is small and the distance D is 0.62 μm or less (see the First Example to Twenty-Fifth Example: see, particularly, the Eleventh Example).

Further, by setting the degree of longitudinal orientation of the magnetic layer 13 to 35% or less (see the First Example to the Twenty-Fifth Examples: see, particularly, the First Example), even if the difference between the first period and the second period is small (the distance D is small), this difference (or the distance D) can be determined more accurately.

Further, by setting the coercive force in the longitudinal direction of the magnetic recording medium 1 to 2,000 Oe or less, even if the difference between the first period and the second period is small (the distance D is small), this difference (or the distance D) can be determined more accurately.

Further, by setting the ratio of the area of the servo bands s to the area of the entire surface of the magnetic layer 13 to 4.0% or less, the area of the data band d is increased, and the recording capacity of data can be improved. Further, by setting the width of the servo band s to 95 μm or less, the width of the data band d is widened, and the recording capacity of data can be improved.

Further, by setting the recording track width Wd to 2.0 μm or less, the number of recording tracks 5 included in one data band d can be increased. As a result, the recording density of data can be further improved.

Further, by setting the one-bit length in the longitudinal direction in the data signal to be recorded on the data band d to 48 nm or less, the recording density of data can be further improved.

Further, setting the thickness of the magnetic layer 13 to 90 nm or less, it is possible to improve the electromagnetic conversion characteristics. Further, by setting the thickness of the magnetic layer 13 set to 90 nm or less, the full width at half maximum of the isolated waveform in the reproduced waveform of the servo signal 6 can be reduced (to 195 nm or less), and the peak of the reproduced waveform in the servo signal can be sharpened (see the First Example to the Twenty-Fifth Example). Since this improves the accuracy of reading the servo signal 6, the number of recording tracks can be increased to improve the recording density of data.

Further, by setting the particle volume (average volume Vave) of the magnetic powder to 2,300 nanometers$^3$ or less, the full width at half maximum of the isolated waveform in the reproduced waveform of the servo signal 6 can be reduced (to 195 nm or less), and the peak of the reproduced waveform of the servo signal can be sharpened (see the First Example to the Twenty-Fifth Example). Since this improves the accuracy of reading the servo signal, the number of recording tracks be increased to improve the recording density of data.

Method of Producing Magnetic Recording Medium

Next, a method of producing the magnetic recording medium 1 will be described. First, a coating material for forming a non-magnetic layer is prepared by kneading and dispersing a non-magnetic powder, a binder, a lubricant, and the like in a solvent. Next, a coating material for forming a magnetic layer is prepared by kneading and dispersing a magnetic powder, a binder, a lubricant, and the like in a solvent. Next, a coating material for forming a back layer is prepared by kneading and dispersing a binder, a non-magnetic powder, and the like in a solvent. For preparing the coating material for forming a magnetic layer, the coating material for forming a non-magnetic layer, and the coating material for forming a back layer, for example, the following solvents, dispersing devices, and kneading devices can be used.

Examples of the solvent used for preparing the above-mentioned coating materials include a ketone solvent such as acetone, methyl ethyl ketone, methyl isobutyl ketone, and cyclohexanone, an alcohol solvent such as methanol, ethanol, and propanol, an ester solvent such as methyl acetate, ethyl acetate, butyl acetate, propyl acetate, ethyl lactate, and ethylene glycol acetate, an ether solvent such as diethylene glycol dimethyl ether, 2-ethoxyethanol, tetrahydrofuran, and dioxane, an aromatic hydrocarbon solvent such as benzene, toluene, and xylene, and a halogenated hydrocarbon solvent such as methylene chloride, ethylene chloride, carbon tetrachloride, chloroform, and chlorobenzene. These may be used alone or may be appropriately mixed and used.

As the above-mentioned kneading device used for the preparation of the coating materials, for example, a kneading device such as a continuous twin-screw kneader, a continuous twin-screw kneader capable of diluting in multiple stages, a kneader, a pressure kneader, and a roll kneader can be used. However, the present technology is not particularly limited to these devices. Further, as the above-mentioned dispersing device used for preparing the above-mentioned coating material, for example, a dispersing device such as a roll mill, a ball mill, a horizontal sand mill, a vertical sand mill, a spike mill, a pin mill, a tower mill, a pearl mill (e.g., "DCP Mill" manufactured by Eirich Co., Ltd.), a homogenizer, and an ultrasonic disperser can be used. However, the present technology is not particularly limited to these devices.

Next, the non-magnetic layer 12 is formed by applying a coating material for forming a non-magnetic layer onto one main surface of the base material 11 and drying the coating material. Subsequently, a coating material for forming a magnetic layer is applied onto the non-magnetic layer 12 and dried to form the magnetic layer 13 on the non-magnetic layer 12. Note that it is favorable to orient, during drying, the magnetic field of the magnetic powder in the thickness direction of the base material 11 by means of, for example, a solenoid coil. Further, during drying, after orienting the magnetic field of the magnetic powder in the traveling direction (longitudinal direction) of the base material 11 by means of, for example, a solenoid coil, the magnetic field may be oriented in the thickness direction of the base material 11. After forming the magnetic layer 13, the back layer 14 is formed by applying a coating material for forming a back layer onto the other main surface of the base material 11 and drying the coating material. As a result, the magnetic recording medium 1 is obtained.

After that, calendaring treatment is performed on the obtained magnetic recording medium 1 to smooth the surface of the magnetic layer 13. Next, the magnetic recording medium 1 on which calendaring treatment has been performed is wound into rolls, and then, heat treatment is performed on the magnetic recording medium 1 in this condition to transfer a large number of protrusions 14A on the surface of back layer 14 to the surface of the magnetic layer 13. As a result, a large number of holes 13A are formed on the surface of the magnetic layer 13.

The temperature of the heat treatment is favorably 55° C. or higher and 75° C. or less. In the case where the temperature of the heat treatment is 55° C. or higher, favorable transferability can be achieved. Meanwhile, in the case where the temperature of the heat treatment is 75° C. or more, the amount of pores becomes too large, and the lubricant on the surface becomes excessive. Here, the temperature of the heat treatment is the temperature of the atmosphere in which the magnetic recording medium 1 is held.

The time of the heat treatment is favorably 15 hours or more and 40 hours or less. In the case where the time of the heat treatment is 15 hours or more, favorable transferability can be obtained. Meanwhile, in the case where the time of the heat treatment is 40 hours or less, a decrease in productivity can be suppressed.

Finally, the magnetic recording medium 1 is cut into a predetermined width, (e.g., ½ inch width). In this way, the target magnetic recording medium 1 is obtained.

[Process of Preparing Coating Material for Forming a Magnetic Layer]

Next, the process of preparing a coating material for forming a magnetic layer will be described. First, a first composition of the following formulation was kneaded with an extruder. Next, the kneaded first composition and a second composition of the following formulation were added to a stirring tank including a dispersion device to perform preliminary mixing. Subsequently, sand mill mixing was further performed, and filter treatment was performed to prepare a coating material for forming a magnetic layer (First Composition)

Powder of barium ferrite ($BaFe_{12}O_{19}$) particles (hexagonal plate-shaped, aspect-ratio 2.8, particle volume 1,950 $nm^3$): 100 parts by mass Vinyl chloride resin (30% by mass of cyclohexanone solution: 10 parts by mass (the degree of polymerization 300, Mn=10,000, $OSO_3K$=0.07 mmol/g and secondary OH=0.3 mmol/g are contained as polar groups)

(Aluminum oxide powder: 5 parts by mass ($\alpha$-$Al_2O_3$, average particle size 0.2 μm)

Carbon black: 2 parts by mass (Manufactured by Tokai Carbon Co., Ltd., trade name: Seast TA)

(Second Composition)

Vinyl chloride resin: 1.1 parts by mass (Resin solution: resin content 30% by mass, cyclohexanone 70% by mass)

N-butyl stearate: 2 parts by mass

Methyl ethyl ketone: 121.3 parts by mass

Toluene: 121.3 parts by mass

Cyclohexanone: 60.7 parts by mass

Finally, four parts by mass of polyisocyanate (trade name: Coronate L, manufactured by Nippon Polyurethane Co., Ltd.) and two parts by mass of myristic acid were added, as curing agents, to the coating material for forming a magnetic layer prepared as described above.

[Process of Preparing Coating Material for Forming Non-Magnetic Layer]

Next, the process of preparing a coating material for forming a non-magnetic layer will be described. First, a third composition of the following formulation was kneaded with an extruder. Next, the kneaded third composition and a fourth composition of the following formulation were added to a stirring tank including a dispersion device to perform preliminary mixing. Subsequently, sand mill mixing was further performed, and filter treatment was performed to prepare a coating material for forming a non-magnetic layer.

(Third Composition)

Acicular iron oxide powder: 100 parts by mass ($\alpha$-$Fe_2O_3$, average major axis length 0.15 μm)

Vinyl chloride resin: 55.6 parts by mass (Resin solution: resin content 30% by mass, cyclohexanone 70% by mass)

Carbon black: 10 parts by mass (Average particle size 20 nm)

(Fourth Composition)

Polyurethane resin UR8200 (manufactured by Toyobo CO., LTD.): 18.5 parts by weight N-butyl stearate: 2 parts by mass Methyl ethyl ketone: 108.2 parts by mass Toluene: 108.2 parts by mass Cyclohexanone: 18.5 parts by mass Finally, four parts by mass of polyisocyanate (trade name: Coronate L, manufactured by Nippon Polyurethane Co., Ltd.) and two parts by mass of myristic acid were added, as curing agents, to the coating material for forming a non-magnetic layer prepared as described above.

[Process of Preparing Coating Material for Forming Back Layer]

Next, the process of preparing the coating material for forming a back layer will be described. A coating material for forming a back layer was prepared by mixing the following raw materials in a stirring tank including a dispersion device and performing filter treatment thereon.

Powder of carbon black particles (average particle size 20 nm): 90 parts by mass Powder of carbon black particles (average particle size 270 nm): 10 parts by mass Polyester polyurethane: 100 parts by mass (Manufactured by Nippon Polyurethane Co., Ltd., trade name: N-2304)

Methyl ethyl ketone: 500 parts by mass

Toluene: 400 parts by mass

Cyclohexanone: 100 parts by mass

Note that the type and the blending amount of the inorganic particles may be changed as follows.

Powder of carbon black particles (average particle size 20 nm): 80 parts by mass Powder of carbon black particles (average particle size 270 nm): 20 parts by mass Further, the type and the blending amount of the inorganic particles may be changed as follows.

Powder of carbon black particles (average particle size 270 nm): 100 parts by mass

[Application Process]

The coating material for forming a magnetic layer and coating material for forming a non-magnetic layer prepared as described above were used to form a non-magnetic layer having an average thickness of 1.0 to 1.1 μm and a magnetic layer having an average thickness of 40 to 100 nm on one main surface of a long polyethylene naphthalate film (hereinafter, referred to as "PEN film".) (e.g., having an average thickness of 4.0 μm), which is a non-magnetic support, in the following manner. First, the coating material for forming a non-magnetic layer was applied onto one main surface of the PEN film and dried to form a non-magnetic layer. Next, the coating material for forming a magnetic layer was applied onto the non-magnetic layer and dried to form a magnetic layer. Note that when the coating material for forming a magnetic layer was dried, the magnetic field of the magnetic powder was oriented in the thickness direction of the film by means of a solenoidal coil. Note that by adjusting the strength (two to three times the coercive force of the magnetic powder) of the magnetic field from the solenoid coil, adjusting the solid content of the coating material for forming a magnetic layer, or adjusting the drying conditions (drying temperature and drying time) of the coating material for forming a magnetic layer to adjust the conditions for orienting the magnetic powder in the magnetic field, the squareness ratio S1 in the thickness direction of the magnetic tape (perpendicular direction) and the squareness ratio S2 in the longitudinal direction were set to predetermined values. Subsequently, a non-magnetic layer was formed by applying the coating material for forming a back layer onto the other main surface of the PEN film and drying the coating material. As a result, a magnetic tape was obtained. Note that, in order to increase the squareness ratio (degree of orientation), it is necessary to improve the dispersed state of the coating material for forming a magnetic layer. Further, in order to increase the degree of perpendicular orientation, a method of magnetizing the magnetic powder in advance before the magnetic tape enters the orientation device is also effective.

[Calendar Process, Transfer Process]

Subsequently, calendar treatment was performed to smooth the surface of the magnetic layer. Next, the obtained magnetic tape was wound into rolls. After that, in this state, heat treatment at 60° C. for 10 hours was performed on the magnetic tape twice. As a result, a large number of protrusions on the surface of the back layer were transferred to the surface of the magnetic layer, and a large number of holes were formed on the surface of the magnetic layer.

[Cutting Process]

The magnetic tape obtained as described above was cut into a ½ inch (12.65 mm) width. As a result, a target long magnetic tape was obtained.

Various Modified Examples

It should be noted that the present technology may take the following configurations.

(1) A magnetic recording medium, including:
a base material; and
a magnetic layer, in which
the magnetic recording medium has a tape shape that is long in a longitudinal direction and short in a width direction,
the magnetic layer includes a data band and a servo band, a data signal being written to the data band, the data band being long in the longitudinal direction, a servo signal being written to the servo data, the servo band being long in the longitudinal direction, the degree of perpendicular orientation of the magnetic layer being 65% or more,
a full width at half maximum of an isolated waveform in a reproduced waveform of the servo signal is 195 nm or less,
the magnetic layer has a thickness of 90 nm or less, and
the base material has a thickness of 4.2 μm or less.

(2) The magnetic recording medium according to (1) above, in which
the full width at half maximum of the isolated waveform is 180 nm or less.

(3) The magnetic recording medium according to (2) above, in which
the full width at half maximum of the isolated waveform is 160 nm or less.

(4) The magnetic recording medium according to (3) above, in which
the full width at half maximum of the isolated waveform is 140 nm or less.

(5) The magnetic recording medium according to (4) above, in which
the full width at half maximum of the isolated waveform is 120 nm or less.

(6) The magnetic recording medium according to any one of (1) to (5) above, in which
the degree of perpendicular orientation is 70% or more.

(7) The magnetic recording medium according to (6) above, in which
the degree of perpendicular orientation is 75% or more.

(8) The magnetic recording medium according to (7) above, in which
the degree of perpendicular orientation is 80% or more.

(9) The magnetic recording medium according to any one of (1) to (8) above, in which
the data band includes a plurality of recording tracks that is long in the longitudinal direction, aligned in the width direction, and has a predetermined recording track width for each track in the width direction,
the servo signal includes a plurality of stripes that is inclined with a predetermined azimuth angle with respect to the width direction, and
a distance in the longitudinal direction between a point P1 and a point P2 is 0.08 μm or more, the point P1 being an arbitrary point on an arbitrary stripe among the plurality of stripes, the point P2 being a point on the arbitrary stripe at a distance by an amount corresponding to the recording track width in the width direction with respect to the point P1.

(10) The magnetic recording medium according to (9) above, in which
the distance between the point P1 and the pint P2 in the longitudinal direction is 0.62 μm or less.

(11) The magnetic recording medium according to any one of (1) to (10) above, in which
the degree of longitudinal orientation of the magnetic layer is 35% or less.

(12) The magnetic recording medium according to any one of (1) to (11) above, in which
the magnetic recording medium has a coercive force of 2,000 Oe or less in the longitudinal direction.

(13) The magnetic recording medium according to any one of (1) to (12) above, in which
a ratio of the area of the servo band to the area of an entire surface of the magnetic layer is 4.0% or less.

(14) The magnetic recording medium according to any one of (1) to (13) above, in which
the magnetic layer contains a magnetic powder, and
the magnetic powder has a particle volume of 2,300 $nm^3$ or less.

(15) The magnetic recording medium according to any one of (1) to (14) above, in which
the number of data bands is 4n (n represents an integer greater than or equal to two), and
the number of servo bands is 4n+1.

(16) The magnetic recording medium according to any one of (1) to (15) above, in which
a width of the servo band is 95 μm or less.

(17) The magnetic recording medium according to any one of (1) to (16) above, in which
the data band has a plurality of recording tracks that is long in the longitudinal direction, is aligned in the width direction, and has a predetermined recording track width for each track in the width direction, and
the recording track width is 2.0 μm or less.

(18) The magnetic recording medium according to any one of (1) to (17) above, in which
one-bit length in the longitudinal direction in a data signal to be recorded on the data band is 48 nm or less.

(19) The magnetic recording medium according to any one of (1) to (18) above, in which
the magnetic layer includes a magnetic powder of hexagonal ferrite, ε-iron oxide, or cobalt-containing ferrite.

(20) A cartridge, including:
a magnetic recording medium including
a base material, and
a magnetic layer, in which
the magnetic recording medium has a tape shape that is long in a longitudinal direction and short in a width direction,
the magnetic layer includes a data band and a servo band, a data signal being written to the data band, the data band being long in the longitudinal direction, a servo signal being written to the servo data, the servo band being long in the longitudinal direction, the degree of perpendicular orientation of the magnetic layer being 65% or more, a full width at half maximum of an isolated waveform in a reproduced waveform of the servo signal is 195 nm or less,
the magnetic layer has a thickness of 90 nm or less, and the base material has a thickness of 4.2 µm or less.

REFERENCE SIGNS LIST d data band
s servo band
5 recording track
6 servo signal
7 stripe
1 magnetic recording medium
11 base material
12 non-magnetic layer
13 magnetic layer
14 back layer
20 data recording device

The invention claimed is:
1. A magnetic recording medium, comprising:
a base material; and
a magnetic layer, wherein
the magnetic recording medium has a tape shape that is long in a longitudinal direction and short in a width direction,
the magnetic layer includes a data band and a servo band, a data signal being written to the data band, the data band being long in the longitudinal direction, a servo signal being written to the servo data, the servo band being long in the longitudinal direction, the degree of perpendicular orientation of the magnetic layer being 65% or more,
a full width at half maximum of an isolated waveform in a reproduced waveform of the servo signal is 195 nm or less,
the magnetic layer has a thickness of 90 nm or less, and the base material has a thickness of 4.2 µm or less.
2. The magnetic recording medium according to claim 1, wherein
the full width at half maximum of the isolated waveform is 180 nm or less.
3. The magnetic recording medium according to claim 2, wherein
the full width at half maximum of the isolated waveform is 160 nm or less.
4. The magnetic recording medium according to claim 3, wherein
the full width at half maximum of the isolated waveform is 140 nm or less.
5. The magnetic recording medium according to claim 4, wherein
the full width at half maximum of the isolated waveform is 120 nm or less.
6. The magnetic recording medium according to claim 1, wherein
the degree of perpendicular orientation is 70% or more.
7. The magnetic recording medium according to claim 6, wherein
the degree of perpendicular orientation is 75% or more.
8. The magnetic recording medium according to claim 7, wherein
the degree of perpendicular orientation is 80% or more.
9. The magnetic recording medium according to claim 1, wherein
the data band includes a plurality of recording tracks that is long in the longitudinal direction, aligned in the width direction, and has a predetermined recording track width for each track in the width direction,
the servo signal includes a plurality of stripes that is inclined with a predetermined azimuth angle with respect to the width direction, and
a distance in the longitudinal direction between a point P1 and a point P2 is 0.08 µm or more, the point P1 being an arbitrary point on an arbitrary stripe among the plurality of stripes, the point P2 being a point on the arbitrary stripe at a distance by an amount corresponding to the recording track width in the width direction with respect to the point P1.
10. The magnetic recording medium according to claim 9, wherein
the distance between the point P1 and the pint P2 in the longitudinal direction is 0.62 µm or less.
11. The magnetic recording medium according to claim 1, wherein
the degree of longitudinal orientation of the magnetic layer is 35% or less.
12. The magnetic recording medium according to claim 1, wherein
the magnetic recording medium has a coercive force of 2,000 Oe or less in the longitudinal direction.
13. The magnetic recording medium according to claim 1, wherein
a ratio of the area of the servo band to the area of an entire surface of the magnetic layer is 4.0% or less.
14. The magnetic recording medium according to claim 1, wherein
the magnetic layer contains a magnetic powder, and
the magnetic powder has a particle volume of 2,300 nm$^3$ or less.
15. The magnetic recording medium according to claim 1, wherein
the number of data bands is 4n (n represents an integer greater than or equal to two), and
the number of servo bands is 4n+1.
16. The magnetic recording medium according to claim 1, wherein
a width of the servo band is 95 µm or less.
17. The magnetic recording medium according to claim 1, wherein
the data band has a plurality of recording tracks that is long in the longitudinal direction, is aligned in the width direction, and has a predetermined recording track width for each track in the width direction, and
the recording track width is 2.0 µm or less.
18. The magnetic recording medium according to claim 1, wherein
one-bit length in the longitudinal direction in a data signal to be recorded on the data band is 48 nm or less.
19. The magnetic recording medium according to claim 1, wherein
the magnetic layer includes a magnetic powder of hexagonal ferrite, ε-iron oxide, or cobalt-containing ferrite.
20. A cartridge, comprising:
a magnetic recording medium including
a base material, and
a magnetic layer, wherein
the magnetic recording medium has a tape shape that is long in a longitudinal direction and short in a width direction,
the magnetic layer includes a data band and a servo band, a data signal being written to the data band, the data band being long in the longitudinal direction, a servo signal being written to the servo data, the servo band being long in the longitudinal direction, the degree of perpendicular orientation of the magnetic layer being 65% or more, a full width at half maximum of an isolated waveform in a reproduced waveform of the servo signal is 195 nm or less, the magnetic layer has a thickness of 90 nm or less, and
the base material has a thickness of 4.2 μm or less.

* * * * *